(12) United States Patent
Qi et al.

(10) Patent No.: US 12,045,681 B2
(45) Date of Patent: *Jul. 23, 2024

(54) SYSTEMS AND METHODS FOR RFID POSITIONING

(71) Applicants: Georgia Tech Research Corporation, Atlanta, GA (US); University of Rome Tor Vergata, Roma RM (IT)

(72) Inventors: Cheng Qi, Atlanta, GA (US); Francesco Amato, Irsina (IT); Gregory David Durgin, Atlanta, GA (US)

(73) Assignees: Georgia Tech Research Corporation, Atlanta, GA (US); University of Rome Tor Vergata, Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,483

(22) Filed: Oct. 10, 2023

(65) Prior Publication Data
US 2024/0054310 A1    Feb. 15, 2024

Related U.S. Application Data

(63) Continuation of application No. 17/650,571, filed on Feb. 10, 2022, now Pat. No. 11,803,725.

(60) Provisional application No. 63/148,870, filed on Feb. 12, 2021.

(51) Int. Cl.
G06K 19/07     (2006.01)
G01S 7/41      (2006.01)
G01S 13/536    (2006.01)

(52) U.S. Cl.
CPC .......... *G06K 19/0723* (2013.01); *G01S 7/414* (2013.01); *G01S 13/536* (2013.01)

(58) Field of Classification Search
CPC ........ G01S 13/38; G01S 13/536; G01S 13/75; G01S 7/414; G06K 19/0723; G06K 7/10009; G06K 7/10099; G06K 7/10118
See application file for complete search history.

(56) References Cited

U.S. PATENT DOCUMENTS

| | | | |
|---|---|---|---|
| 8,179,231 B1 * | 5/2012 | Varahramyan ..... | G06K 19/0672 340/572.1 |
| 2003/0195723 A1 * | 10/2003 | Bensky ................... | G01S 13/84 702/189 |
| 2008/0012710 A1 * | 1/2008 | Sadr ........................ | G01S 7/023 340/572.1 |
| 2008/0150699 A1 * | 6/2008 | Ohara ..................... | H04B 17/27 340/10.4 |

(Continued)

*Primary Examiner* — Omer S Khan
(74) *Attorney, Agent, or Firm* — Troutman Pepper Hamilton Sanders LLP; Ryan A. Schneider; Mark Lehi Jones

(57) ABSTRACT

Systems and methods for radiolocation using backscatter RFID tags and a special-purpose reader that produces a SFCW RF interrogation signal comprising N carrier frequencies. A backscattered interrogation signal from a backscatter RFID tag is down-converted using at least a portion of the generated SFCW RF interrogation signal. RSP corresponding to the N carrier frequencies are determined. RSS may be determined to improve performance. A distance between the RFID reader and the backscatter RFID tag may be estimated based on at least a summation of differences between RSPs corresponding to adjacent carrier frequencies.

20 Claims, 14 Drawing Sheets

(56) References Cited

U.S. PATENT DOCUMENTS

| | | | |
|---|---|---|---|
| 2013/0106578 A1* | 5/2013 | Forster | A61B 5/6891 |
| | | | 340/10.1 |
| 2013/0181862 A1* | 7/2013 | Matsumoto | G01S 13/38 |
| | | | 342/127 |
| 2016/0195607 A1* | 7/2016 | Roulston | G01S 13/106 |
| | | | 342/201 |
| 2017/0199268 A1* | 7/2017 | Frederick | G01S 13/82 |
| 2021/0373111 A1* | 12/2021 | Hui | G01S 1/0428 |

\* cited by examiner

SYSTEMS AND METHODS FOR RFID POSITIONING

CROSS-REFERENCE TO RELATED APPLICATIONS

This is a continuation application of U.S. application Ser. No. 17/650,571 filed 10 Feb. 2022, which Application claims the benefit of U.S. Provisional Application No. 63/148,870, filed on 12 Feb. 2021, each of which is incorporated herein by reference in its entirety as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The disclosed technology relates to systems and methods for radiolocation using backscatter radio frequency identification (RFID) tags and a special purpose RFID reader that interrogates the backscatter RFID tags with a stepped-frequency continuous wave (SFCW) radio frequency (RF) interrogation signal.

2. Description of Related Art

Radiolocation determination in realistic environments can be inaccurate due to factors such as multipath echoes and fading. High-accuracy positioning is typically performed with optical sensors that have a limited range, long setup time, and environmental limitations, particularly when used outdoors in sunlight.

RFID systems typically involve the use of small, low-cost, electronic RFID tags that store information including identification information. Backscatter RFID tags include an antenna that can receive an interrogation signal from a reader, and circuitry that can modulate and reflect/backscatter the modulated signal so that the reader device can wirelessly interrogate a tag and receive such identification information. The tags may be placed on equipment, vehicles, pallets, or people, for example, and the corresponding identification of the tags may be determined by the reader.

It is often desirable to obtain the location of items having attached RFID tags. The typical RFID reader can obtain identification information for tags located within the range of the reader, but obtaining highly accurate distance or location information is still a challenge.

In some cases, RFID tags and/or RFID readers may be moving or stationary. In many situations, it is desirable to determine the precise location of a tag and/or reader.

Current motion capture technology involves bulky sensor boxes and has ranges of only a few meters. Traditional location trackers using backscattering RFID tags can provide certain advantages such as smaller sizes, reduced complexity, and low power requirements; however, they have limited ranges, low ranging precision, and typically must be placed in the line-of-sight (LoS) of an RFID reader.

For stable wireless communication and localization with Internet-of-things (IoT) devices, an accurate propagation channel model is needed. Traditional channel modeling relies on complicated sliding correlator systems or bulky lab equipment such as Vector Network Analyzers (VNAs), synthesized sweepers, etc. In practice, local oscillator synchronization is difficult to achieve, and often a cable is connected between source and measurement nodes to share a common frequency reference, which greatly limits the range of measurements.

There is a need for a versatile fine-scale localization technology that operates in realistic environments. Such technology could enable numerous commercial and scientific sensing applications.

It is thus desirable to have systems and methods for radiolocation using backscatter RFID tags and a special-purpose reader that produces a SFCW RF interrogation signal comprising N carrier frequencies. Such technology can include a backscattered interrogation signal from a backscatter RFID tag being down-converted using at least a portion of the generated SFCW RF interrogation signal. RSP corresponding to the N carrier frequencies can be determined. RSS may be determined to improve performance. A distance between the RFID reader and the backscatter RFID tag may be estimated based on at least a summation of differences between RSPs corresponding to adjacent carrier frequencies.

SUMMARY OF THE INVENTION

The disclosed technology relates to systems and methods for radiolocation using backscatter RFID tags and a special purpose RFID reader that interrogates the backscatter RFID tags with a SFCW RF interrogation signal. A distance between the reader and the tag may be determined by processing the backscattered signal. Certain implementations also enable sensing structures via processing multipath components of the backscattered signal.

In an exemplary embodiment, the present invention is a method of radiolocation comprising generating, by a signal generator of a RFID reader, a SFCW RF interrogation signal comprising N carrier frequencies, splitting off at least a portion of the generated SFCW RF interrogation signal and routing the generated SFCW RF interrogation signal to a local down converter, transmitting at least a portion of the generated SFCW RF interrogation signal by a transmitting (Tx) antenna of the RFID reader, receiving by a receiving (Rx) antenna of the RFID reader and in response to the transmitting, a backscattered signal from a backscatter RFID tag, wherein the backscatter RFID tags comprise one or more quantum tunneling tags (QTTs), down-converting the received backscattered signal using at least a portion of the generated SFCW RF interrogation signal, determining, from the down-converted signal, received signal phases (RSP) corresponding to the N carrier frequencies and a received signal strength (RSS), estimating a distance between the RFID reader and the backscatter RFID tag based on a summation of differences between RSPs corresponding to adjacent carrier frequencies, determining a normalized complex received signal from the down-converted signal, determining an un-normalized complex received signal from the down-converted signal, determining a delay profile using both the normalized complex received signal and un-normalized complex received signal, estimating an improved distance measurement RFID reader and the backscatter RFID tag based on the delay profile, and outputting the improved estimate of the distance.

In any of the embodiments disclosed herein, the backscattered signal received from the one or more backscatter RFID tags can comprise a version of the SFCW RF interrogation signal that is modulated and backscattered by the one or more backscatter RFID tags.

In any of the embodiments disclosed herein, the down-converting can be performed by a local down-converter of the RFID reader, and wherein the local down-converter is configured to output an in-phase (I) output and quadrature (Q) output corresponding to the backscattered signal.

In any of the embodiments disclosed herein, the SFCW RF interrogation signal can be characterized by a sequence of stepped frequencies in a 5.8 GHz industrial, scientific, and medical (ISM) band, and each of the stepped frequencies are characterized by a dwell time.

In any of the embodiments disclosed herein, the method can further comprise utilizing three or more RFID readers to triangulate a location of the backscatter RFID tag.

In any of the embodiments disclosed herein, the method can further comprise receiving by the Rx antenna of the RFID reader and in response to the transmitting, backscattered signals from a plurality of backscatter RFID tags and estimating a distance between the RFID reader and the plurality of backscatter RFID tags.

In any of the embodiments disclosed herein, the method can further comprise sensing one or more structures between the RFID reader and the backscatter RFID tag based on delayed or multipath components of the backscattered signal.

In another exemplary embodiment, the present invention is a RFID radiolocation system comprising a signal generator configured to output a SFCW RF interrogation signal comprising N carrier frequencies, a Tx antenna, a Rx antenna configured to receive a backscattered signal from one or more backscatter RFID tags, wherein the backscatter RFID tags comprise one or more QTTs, a down-converter configured to output a down-converted signal comprising an I output and a quadrature-phase (Q) output, a splitter in communication with the signal generator, the Tx antenna, and the down-converter, wherein the splitter is configured send a first portion of the SFCW RF interrogation signal to the Tx antenna and is further configured to send a second portion of the SFCW RF interrogation signal to the down-converter, a software-defined radio configured to digitize and filter the down-converted signal from the down-converter, and one or more processors in communication with the software-defined radio, the one or more processors are configured to determine, from the down-converted signal, RSP corresponding to the N carrier frequencies, estimate a distance between the RFID radiolocation system and the backscatter RFID tag based on a summation of differences between RSPs corresponding to adjacent carrier frequencies and a RSS, output the estimate of the distance, determine a normalized complex received signal from the down-converted signal, determine an un-normalized complex received signal from the down-converted signal, determine a delay profile using both the normalized complex received signal and un-normalized complex received signal, estimate an improved distance measurement RFID reader and the backscatter RFID tag based on the delay profile, and output the improved estimate of the distance.

In any of the embodiments disclosed herein, the backscattered signal received from the one or more backscatter RFID tags can comprise a version of the SFCW RF interrogation signal that is modulated and backscattered by the one or more backscatter RFID tags.

In any of the embodiments disclosed herein, the SFCW RF interrogation signal can be characterized by a sequence of stepped frequencies in a 5.8 GHz ISM band, and each of the stepped frequencies are characterized by a dwell time.

In any of the embodiments disclosed herein, the system can further comprise three or more of the radiolocation systems configured to triangulate a location of the backscatter RFID tag.

In any of the embodiments disclosed herein, the system can further comprise one or more amplifiers.

In another exemplary embodiment, the present invention is a non-transitory computer readable storage medium storing instructions for use with one or more processors in communication with a signal generator, a software-defined radio, and memory, and wherein the instructions are configured to cause the one or more processors to perform a method comprising generating, by the signal generator of a RFID reader, a SFCW RF interrogation signal comprising N carrier frequencies, splitting off at least a portion of the generated SFCW RF interrogation signal and routing the generated SFCW RF interrogation signal to a local down converter, transmitting at least a portion of the generated SFCW RF interrogation signal by a Tx antenna of the RFID reader, receiving by a Rx antenna of the RFID reader and in response to the transmitting, a backscattered signal from a backscatter RFID tag, wherein the backscatter RFID tags comprise one or more QTTs, down-converting the received backscattered signal using at least a portion of the generated SFCW RF interrogation signal, determining, from the down-converted signal, RSP corresponding to the N carrier frequencies and a RSS, estimating a distance between the RFID reader and the backscatter RFID tag based on a summation of differences between RSPs corresponding to adjacent carrier frequencies, determining a normalized complex received signal from the down-converted signal, determining an un-normalized complex received signal from the down-converted signal, determining a delay profile using both the normalized complex received signal and un-normalized complex received signal, determining an improved distance measurement RFID reader and the backscatter RFID tag based on the delay profile, and outputting the improved estimate of the distance.

In another exemplary embodiment, the present invention is a method includes generating, by a signal generator of a RFID reader, a SFCW RF interrogation signal comprising N carrier frequencies, splitting off at least a portion of the generated SFCW RF interrogation signal and routing it to a local down converter, transmitting at least a portion of the generated SFCW RF interrogation signal by a Tx antenna of the RFID reader, receiving by a Rx antenna of the RFID reader and in response to the transmitting, a backscattered signal from a backscatter RFID tag, down-converting the received backscattered signal using at least a portion of the generated SFCW RF interrogation signal, determining, from the down-converted signal, RSP corresponding to the N carrier frequencies, and estimating a distance between the RFID reader and the backscatter RFID tag based on a summation of differences between RSPs corresponding to adjacent carrier frequencies.

In another exemplary embodiment of the disclosed technology, a RFID radiolocation system is provided that includes a signal generator configured to output a SFCW RF interrogation signal comprising N carrier frequencies, a Tx antenna, a Rx antenna configured to receive a backscattered signal from one or more backscatter RFID tags, a down-converter configured to output a down-converted signal comprising an I output and a Q output, a splitter in communication with the signal generator, the Tx antenna, and the down-converter, wherein the splitter is configured send a first portion of the SFCW RF interrogation signal to the Tx antenna and is further configured to send a second portion of the SFCW RF interrogation signal to the down-converter, a software-defined radio configured to digitize and filter the down-converted signal from the down-converter. The system includes one or more processors in communication with the software-defined radio, the one or more processors are configured to determine, from the down-converted signal, RSP corresponding to the N carrier frequencies, estimate a distance between the RFID radiolocation system and the backscatter RFID tag based on a summation of differences between RSPs corresponding to adjacent carrier frequencies, and output the estimate of the distance.

In another exemplary embodiment of the disclosed technology, a non-transitory computer-readable storage medium is provided. The medium is configured for storing instructions for use with one or more processors in communication with a signal generator, a software-defined radio, and memory. The instructions are configured to cause the one or more processors to perform a method comprising generating, by the signal generator of a RFID reader, a SFCW RF interrogation signal comprising N carrier frequencies, splitting off at least a portion of the generated SFCW RF interrogation signal and routing it to a local down converter, transmitting at least a portion of the generated SFCW RF interrogation signal by a Tx antenna of the RFID reader, receiving by a Rx antenna of the RFID reader and in response to the transmitting, a backscattered signal from a backscatter RFID tag, down-converting the received backscattered signal using at least a portion of the generated SFCW RF interrogation signal, determining, from the down-converted signal, RSP corresponding to the N carrier frequencies, and estimating a distance between the RFID reader and the backscatter RFID tag based on a summation of differences between RSPs corresponding to adjacent carrier frequencies.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. Similarly, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. To illustrate the disclosure, specific embodiments are shown in the drawings. It should be understood, however, that the disclosure is not limited to the precise arrangements and instrumentalities of the embodiments shown in the drawings.

DETAIL DESCRIPTION OF THE INVENTION

Figure 1:
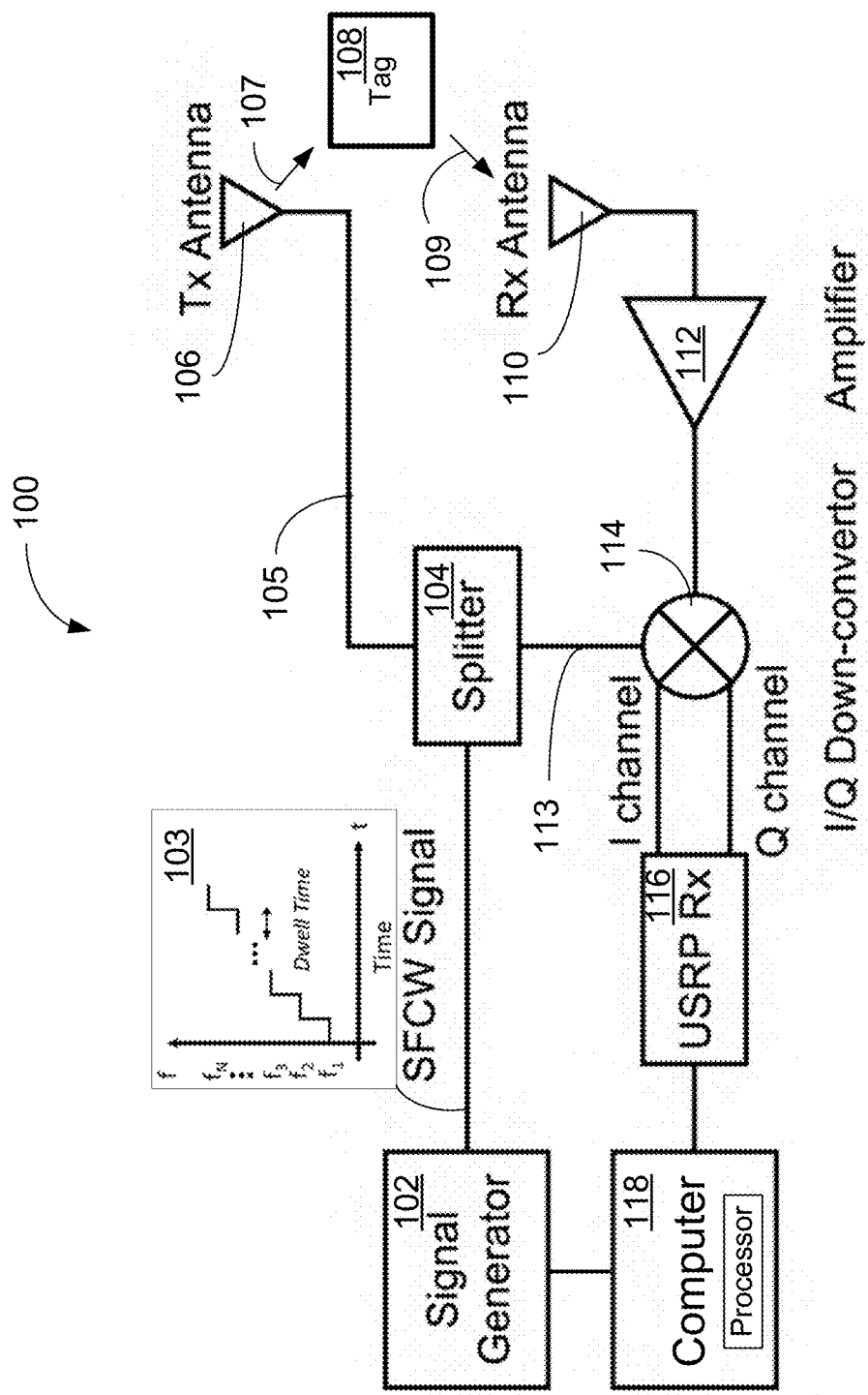
FIG. 1 is a block diagram representation of an RFID reader in accordance with certain exemplary implementations of the disclosed technology.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

The disclosed technology includes systems and methods that utilize unique properties of a RFID backscatter link that can be used to sound the channel with respect to an absolute time scale, thereby enabling accurate ranging and/or location estimates. The disclosed technology further enables the identification and removal of multipath effects from a location estimate.

By measuring the received signal phase and/or the received signal strength, the disclosed technology can accurately estimate the distance between a special-purpose RFID reader and an RFID tag. Certain exemplary implementations of the disclosed technology may determine channel characteristics by calculating the Inverse Discrete Fourier Transform (IDFT) of the received signal in the frequency domain. Certain exemplary implementations of the disclosed technology enable measuring a delay profile of the backscatter channel to estimate channel characteristics in various multipath environments, which is not achieved by any other RFID techniques.

When compared with the state-of-the-art RFID localization systems, the proposed technology gives both higher communication ranges and higher accuracy. Furthermore, most traditional positioning techniques tend to have higher percentage positioning errors when the distances increase; the proposed technology, instead, has a lower percentage positioning error despite the longer ranges.

Since the use of microwave frequencies (e.g.: the 5.8 GHz ISM band) is still uncommon in the RFID industry, the disclosed technology may utilize a custom measurement system to make a real-time frequency hopping coherent reader that extracts the received signal phase (RSP) from a received signal, processes the data, and presents the calculated position on a graphical user interface (GUI) in real-time.

Certain exemplary implementations of the disclosed technology include a backscatter channel sounder that utilizes a frequency hopping reader that hops between multiple frequency channels at 5.8 GHz ISM band, which can provide channel modeling for backscatter communication systems without complicated wired setup and synchronization. Ultra-precise, submeter-scale position at long distances in a real-world environment can also be achieved using the disclosed technology, which can utilize the RSP of the backscattered signals from an RFID tag. In certain implementations, a tunneling tag (for example, one that utilizes an Esaki tunneling diode) may be utilized to improve amplification of backscattered signals while preserving the linear relationship between the reader-to-tag distance and RSP.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include but are not limited to, similar components or steps that are developed after the embodiments disclosed herein.

FIG. 1 is a block diagram representation of an RFID reader system 100 in accordance with certain exemplary implementations of the disclosed technology. The RFID reader system 100 can be considered a "channel sounder" that utilizes a signal generator 102 to produce a stepped-frequency continuous-wave (SFCW) signal 103 (see inset box in FIG. 1). In certain exemplary implementations, the signal generator 102 hops between multiple frequencies in the 5.8 GHz ISM band, however, the disclosed technology is not limited to this frequency range as other frequency bands in the 860-960 MHz and/or 2.4 GHz frequency range, for example may be utilized. One or more of the dwell time, frequency differences between hops or steps ($\Delta f = f_{n+1} - f_n$), the number of frequencies N, and/or sequence/order of frequencies may each be selectively varied. In an experimental setup, a frequency hopping range of 5.725 GHz to 5.825 GHz was utilized, with a frequency bandwidth chosen to be 101 MHz with 101 evenly distributed channels ($\Delta f = 1$ MHz); however, the disclosed technology may utilize other ranges, steps, bandwidth, etc.

In accordance with certain exemplary implementations of the disclosed technology, the SFCW signal 103 may be split using splitter 104 (e.g., RF power divider) with a first portion 105 of the (split) SFCW signal 103 routed to a transmit (Tx) antenna 106 for output 107 to interrogate an RFID tag 108. A receive (Rx) antenna 110 may receive a backscatter signal 109 from the (remote) RFID tag 108, and this received backscatter signal 109 may be amplified with an amplifier 112. A second portion 113 of the (split) SFCW signal 103 may be routed internally to a down-converter 114 that may mix with the (received and amplified) backscatter signal 109 to produce I output and quadrature-phase (Q) signals for input to a universal software radio peripheral (USRP) receiver 116 for sampling and processing the I/Q signals. The output of the USRP receiver 116 may be output to a computer 118 (having one or more processors) for additional processing, display, etc. In certain exemplary implementations, the computer 118 may also be utilized to control the signal generator 102.

Figure 2:
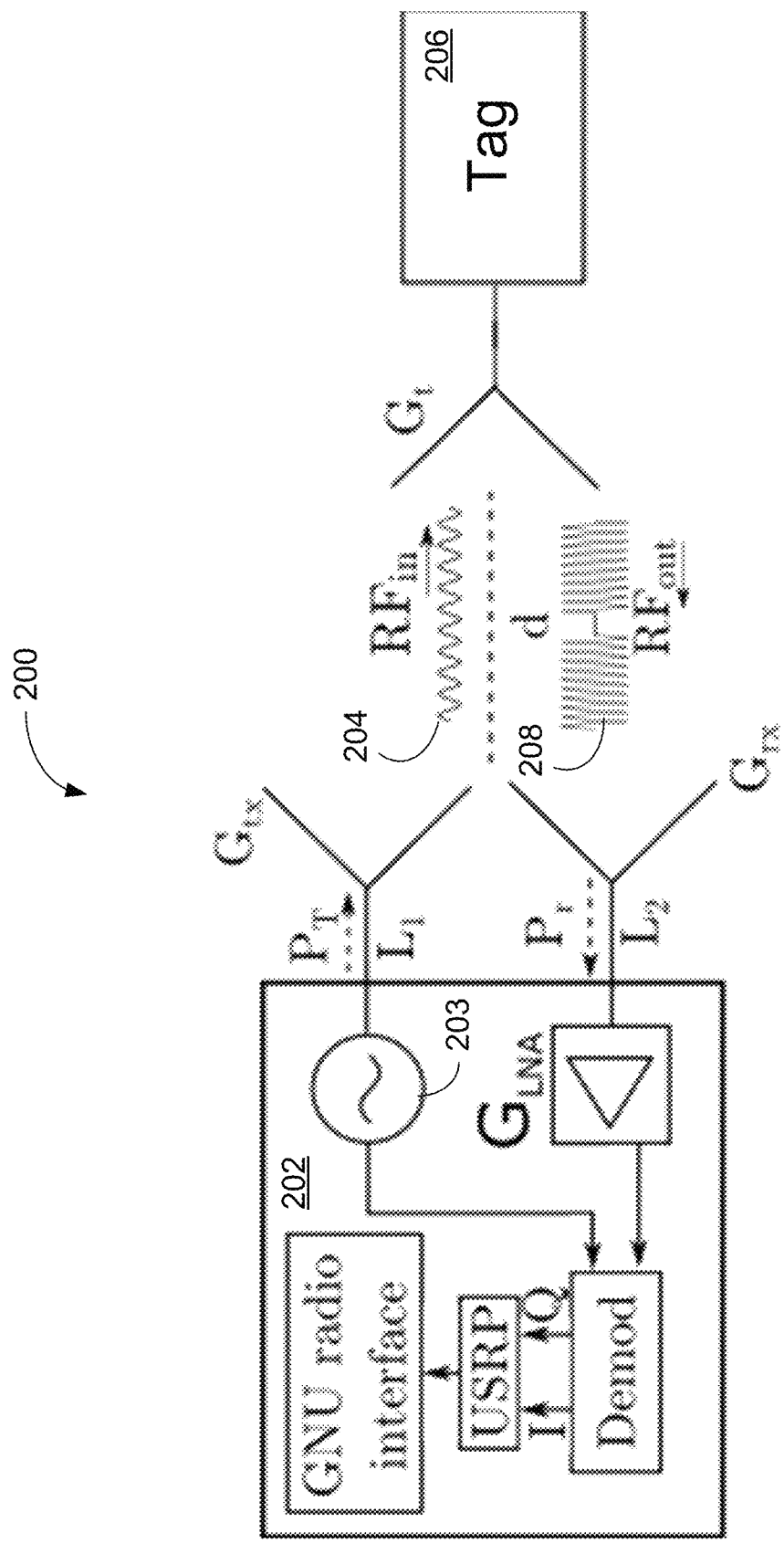
FIG. 2 illustrates an example arrangement of an RFID reader interrogating an RFID tag and receiving a modulated signal from the RFID tag, in accordance with certain exemplary implementations of the disclosed technology.

FIG. 2 illustrates another example system 200 and arrangement having an RFID reader 202 configured for interrogating an RFID tag 206 with an interrogation signal 204 and receiving a modulated backscatter signal 208 from the RFID tag 206, in accordance with certain exemplary implementations of the disclosed technology. Some or all of the components of this example system 200 may correspond to like components of the RFID reader system 100 discussed above with respect to FIG. 1.

An inherent advantage of the disclosed technology is the near-perfect phase coherence of the carrier since the same oscillator 203 (or signal generator 102 in FIG. 1) is used in both the transmitting and the receiving chains. Therefore, the received complex baseband signal after demodulation can be expressed as:

$$\tilde{S}(f_c) = A(f_c) \exp[-j(\varphi_{ps}(f_c) + \varphi_m(f_c) + \varphi_0(f_c))] \quad (1)$$

where $A(f_c)$ is the magnitude of the received signal at the carrier frequency $f_c$, $$\varphi_{ps}(f_c) = \frac{4\pi f_c d}{c} \quad (2)$$

is the phase shift due to the propagated distance d, $\varphi_0(f_c)$ is the phase offset caused by the propagation within hardware (e.g. cables, antennas, tag modulation, and other reader components), and $\varphi_m(f_c)$ is the phase offset caused by the multipath channel.

With the received signal phase (RSP)-based method disclosed herein, the estimated distance between a reader and a tag can be calculated using the received signal phase:

$$\hat{d} = \frac{\lambda_e}{4\pi N} \sum_{n=1}^{N-1} |\varphi_{n+1}(f_{n+1}) - \varphi_n(f_n)| \quad (3)$$

with $\varphi_n$ and $\varphi_{n+1}$ being the measured phases of the received signals obtained by the reader at carrier frequencies $f_n$ and $f_{n+1}$, respectively; N is the number of the frequency channels; and $$\lambda_e = \frac{c}{\Delta f}$$

the equivalent wavelength obtained when a uniform frequency step, $\Delta f = f_{n+1} - f_n$ is used. In accordance with certain exemplary implementations of the disclosed technology, a maximum detection range $\hat{d}_{max}$ of the RSP-based method may be determined by the minimum frequency step of the reader:

$$\hat{d}_{max} = \frac{c}{2\Delta f} = \frac{\lambda_e}{2} \quad (4)$$

Figure 3:
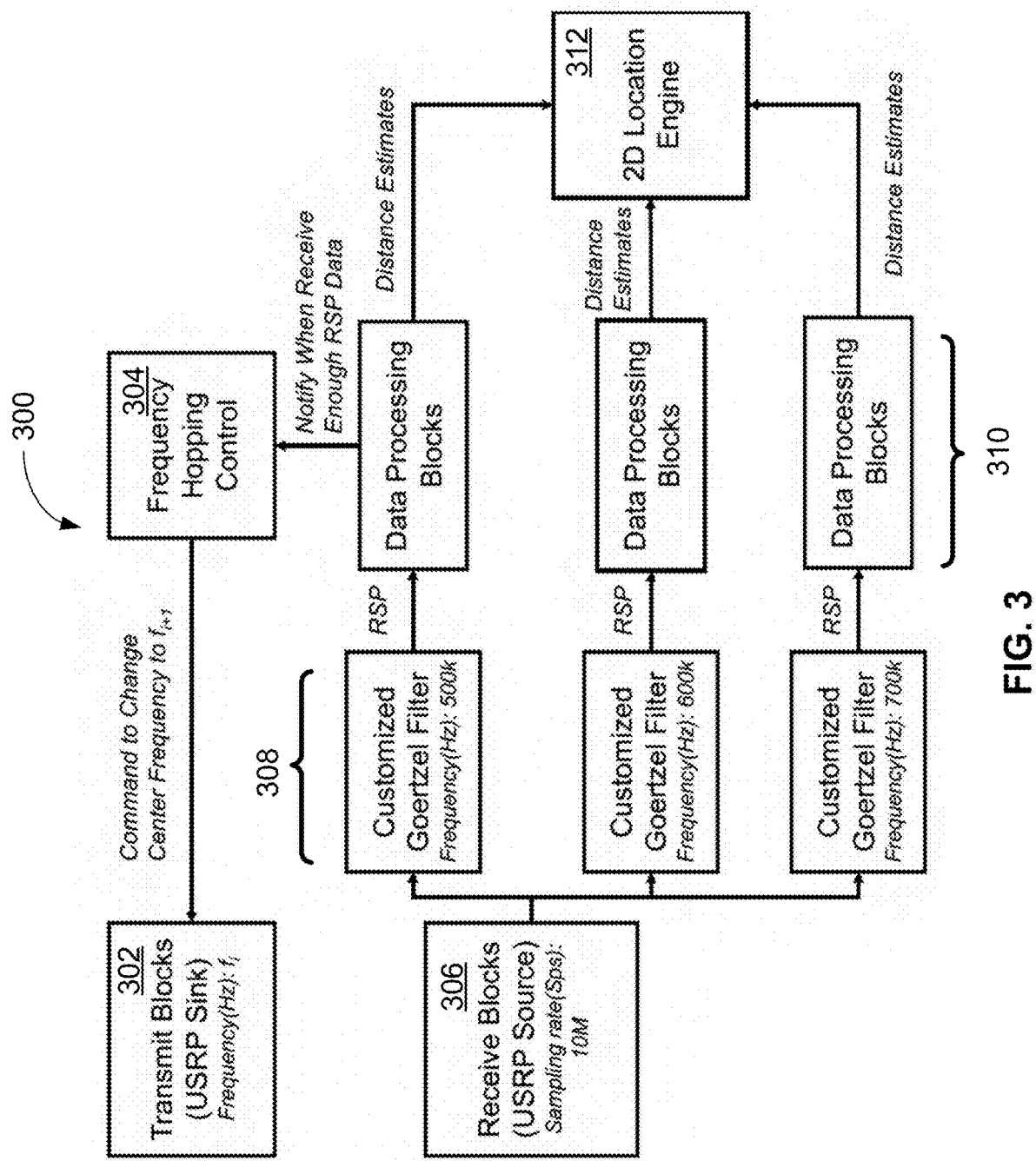
FIG. 3 illustrates an example GNU radio implementation, according to certain aspects of the disclosed technology.

FIG. 3 is a block diagram of an example implementation 300 that may utilize a GNU radio and frequency division multiple access (FDMA), according to certain aspects of the disclosed technology, to collect multiple data in real-time from different tags and to enable radiolocation by trilateration. In this example implementation 300, transmit blocks 302 may receive commands from a frequency hopping control block 304. Receive blocks 306 may output sampled signals to a plurality of custom filters 308 (one of each tag), and the RSP may be processed by corresponding data processing blocks 310. The output of the data processing blocks 310 may be fed to a location engine 312 to determine. In accordance with certain implementations of the disclosed technology, the FDMA may be used in reverse configuration (three fixed tags in this example) to detect the real-time position of a moving reader.

The receiving section 306 may collect three different frequencies backscattered by each tag and may process them through Goertzel filters 308, for example, with pre-set center frequencies, which may act as a single point FFT filter with very narrow bandwidth. The filters 308 may extract the RSP from each tag and, when enough data are collected, the position of the moving reader may be measured and displayed on the GUI in real-time. In certain exemplary implementations, copies of the received raw data output may be saved locally for post-processing. In accordance with certain exemplary implementations of the disclosed technology, the transmitting section may implement the frequency hopping controller 304 that lets the reader interrogate the tags at different frequencies.

Figure 4:
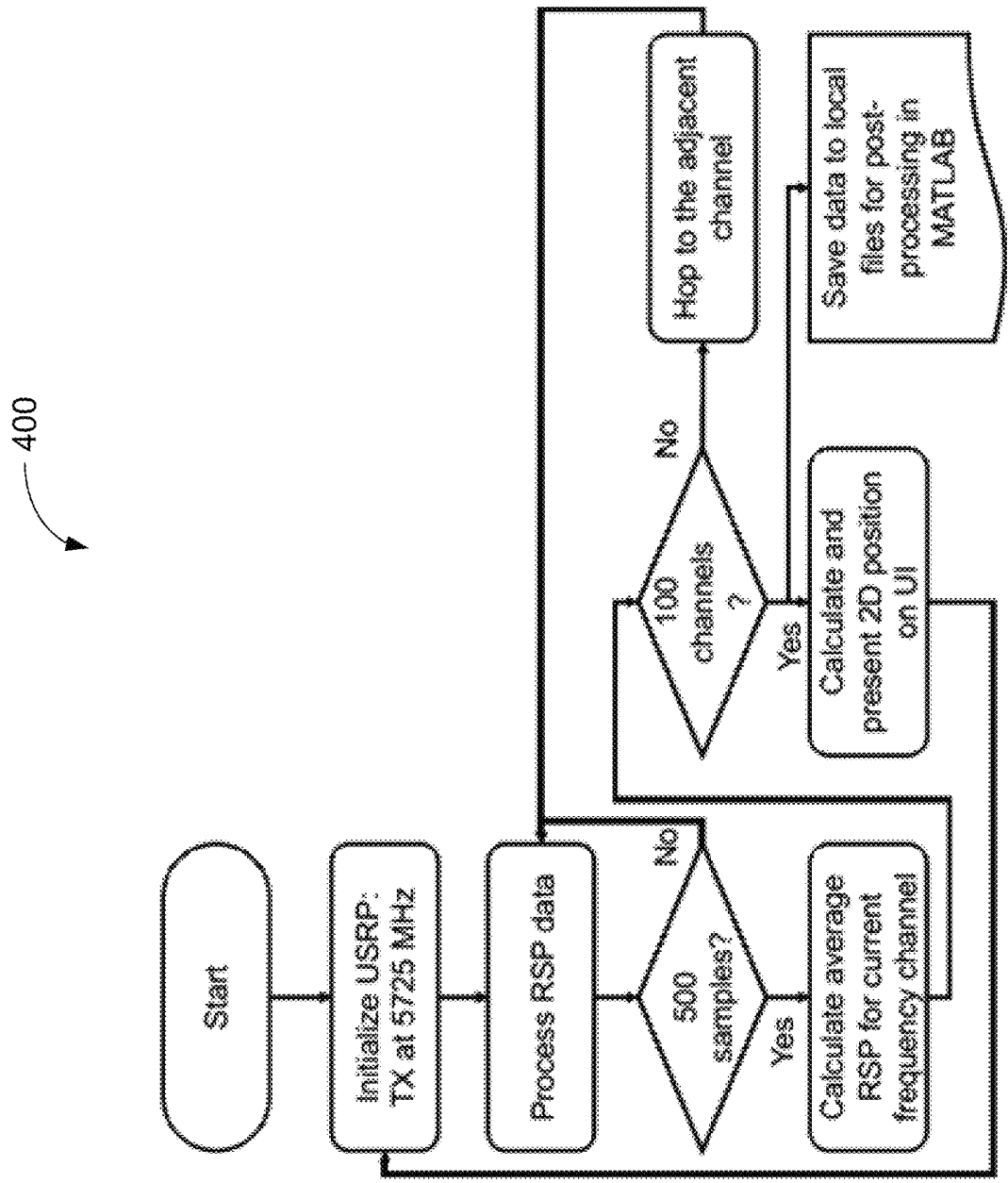
FIG. 4 is an example logic flow diagram for data processing frequency hopping, in accordance with certain exemplary implementations of the disclosed technology.

FIG. 4 is an example logic flow diagram 400 for data processing frequency hopping implementation in real-time using a GNU radio, in accordance with certain exemplary implementations of the disclosed technology. The reader may transmit an unmodulated continuous wave (for example, at 5.785 GHz) until it receives back enough data to process a good estimation of the RSP, which may be set by or correspond to the dwell time (as discussed with respect to FIG. 1). In certain exemplary implementations, a command may be sent to set the transmit frequency to the next adjacent frequency channel, for example, by increasing the transmit frequency by 1 MHz. Once all channels are swept, the reader-to-tag distance may be calculated, the transmit frequency may be reset (for example, to 5.725 GHz) and the positioning measurement may restart.

Figures 5A, 5B, 5C:
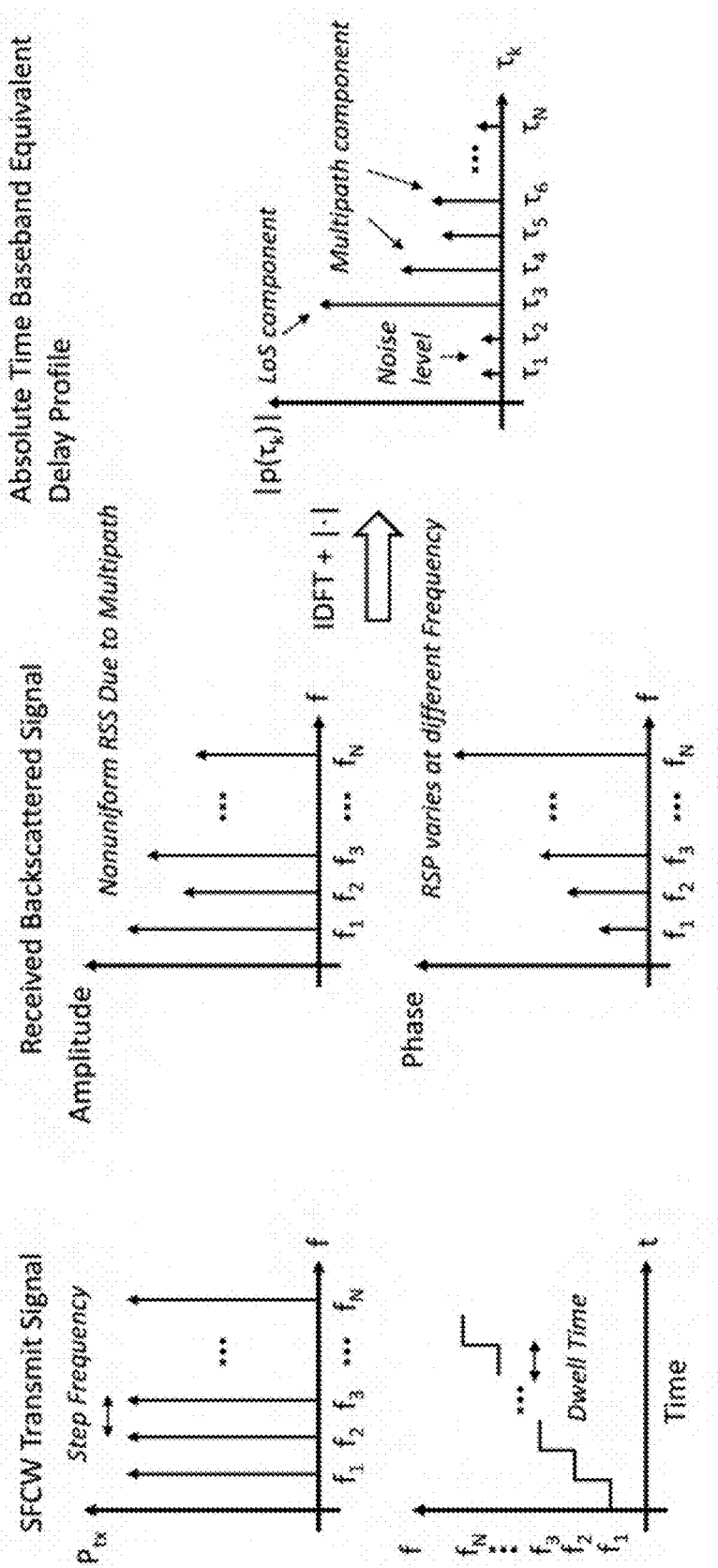
FIG. 5a illustrates an example transmitted SFCW in the frequency domain (top) and time-domain (bottom), in accordance with certain exemplary implementations of the disclosed technology.
FIG. 5b illustrates an example of received backscatter signal amplitude (top) and phase (bottom), in accordance with certain exemplary implementations of the disclosed technology.
FIG. 5c illustrates a time-domain example of post-processed signals derived from the backscatter signal, which can enable ranging and channel sounding, in accordance with certain exemplary implementations of the disclosed technology.

FIGS. 5a-5c illustrate the channel sounding procedure in accordance with certain implementations of the disclosed technology.

FIG. 5a illustrates an example transmitted SFCW in the frequency domain (top) and time-domain (bottom), in accordance with certain exemplary implementations of the disclosed technology.

FIG. 5b illustrates an example of received backscatter signal amplitude (top) also known as the RSS and RSP (phase) at each frequency channel (from $f_1$ to $f_N$) in accordance with certain exemplary implementations of the disclosed technology.

The amplitude and the phase of the received backscattered signals can be expressed as:

$$P_{RSS}(f) = \frac{I_{rx}(f)^2 + Q_{rx}(f)^2}{Z_0} \quad (5)$$

$$\varphi_{RSP}(f) = \arctan\left(\frac{Q_{rx}(f)}{I_{rx}(f)}\right) \in [0, 2\pi) \quad (6)$$

where $Z_0$ is the impedance of the RF circuits, f represents the hopping carrier frequencies of the reader, and $I_{rx}$ and $Q_{rx}$ are the received signals in the baseband for each carrier. Since the down-converted and the transmitted signals share the same signal generator, the channel sounding reader can perform near-perfect coherent phase detection. Moreover, to increase the signal-to-noise ratio (SNR), a GNU Radio built-in Geortzel filter may be used, as discussed above with respect to FIG. 3. Although the transmitted signal may be uniform at each channel, the RSS usually changes for each frequency due to multipath, different frequency responses of the system, temporarily blocked line-of-sight (LoS), etc.

In a multipath free environment, the RSP offset $\varphi_{ps}$ caused by the LoS round-trip propagation can be expressed as $$\varphi_{ps} = -\frac{4\pi d}{\lambda} \quad (7)$$

where $\lambda$ is the wavelength at the carrier frequency f. Therefore, the RSP at different carrier frequencies varies due to the different wavelengths. In certain implementations, the RSPs, like the RSSs, may also be affected by the environment, therefore the differential RSP between adjacent channels is usually not a constant as equation (7) suggests.

In accordance with certain exemplary implementations of the disclosed technology, the RSPs may be utilized to calculate the distance $\hat{d}$ between the reader and the tag, as discussed above with reference to equations (3) and (4) above.

Wireless engineers often model the multipath channels as a collection of discrete multipath components constituting a power delay profile, $p(\tau)$, as a function of delay ($\tau$) as:

$$p(\tau) = \Sigma_i p_i \delta(\tau - \tau_i) \quad (8)$$

with $p_i$ being the backscattered signal received with a time delay $\tau_i$. In the frequency domain, the normalized and un-normalized complex received signal can be expressed as:

$$C(n)_{norm} = \Sigma_{n=1}^{N} \exp(-j\phi_n) \quad (9)$$

$$C(n)_{un-norm} = \Sigma_{n=1}^{N} R_n \exp(-j\phi_n) \quad (10)$$

where $R_n$ and $\phi_n$ are respectively the RSS and RSP at the n-th frequency channel with N being the total number of channels determined by the frequency span and step frequency.

Given the signal in the frequency domain, the discrete power delay profile in time delay domain, $p(\tau_k)$, can be derived using the Inverse Discrete Fourier Transform (IDFT) of the complex received signal C(n) in the frequency domain $$p(\tau_k) = \frac{1}{N}\Sigma_{n=1}^{N} C(n)\exp\left(\frac{-j2\pi n\tau_k}{N}\right) = \frac{1}{N}\Sigma_{n=1}^{N} R_n \exp(-j\phi_n) \quad (11)$$

where $\tau_k$ represents the discrete two-way travel time delay in equation (8).

FIG. 5c illustrates a time-domain example of post-processed signals derived from the backscatter signal, which can enable ranging and channel sounding, in accordance with certain exemplary implementations of the disclosed technology. The delay profile after IDFT may be represented by a summation of Kronecker delta functions with various amplitudes from $\tau_1=1$ to $\tau_N=N$ as:

$$p(\tau_k) = \Sigma_{k=1}^{N} p_k \delta(\tau - \tau_k) \quad (12)$$

Both normalized and un-normalized received signals can be used to calculate the delay profile. The former only requires RSP while the latter needs a good estimation of both RSS and RSP. However, quantum tunneling RFID tags have non-uniform gain depending on the impinging power level and its frequency response. Thus, a delay profile generated using both normalized and un-normalized received signals may be used. To estimate the distance traveled by the backscattered signal, the discrete-time delay $\tau_k$ in equation (11) can be converted to one-way travel distance using:

$$d = \frac{c}{2B}\tau_k \quad (13)$$

where c is the speed of light and B is the bandwidth. The distance between the reader and tag can then be determined by the travel distance of the first arrival component of the delay profile. The resolution of the discrete one-way travel distance and the ambiguous distance are determined by both the bandwidth and the number of channels, respectively:

$$d_{res} = \frac{c}{ZB} \quad (14)$$

$$\text{and } d_{max} = \frac{c}{2B}N \quad (15)$$

Zero-padding is a common technique used to increase the resolution of frequency resolution of the Discrete Fourier Transform (DFT). By appending the actual signal in the frequency domain to a zero vector with a length M, the resolution of the IDFT in the time delay domain can also be improved, resulting in a better distance estimate resolution. The improved distance resolution can be expressed as:

$$d_{res} = \frac{c}{ZB}\frac{N}{N+M} \quad (16)$$

Figure 6:
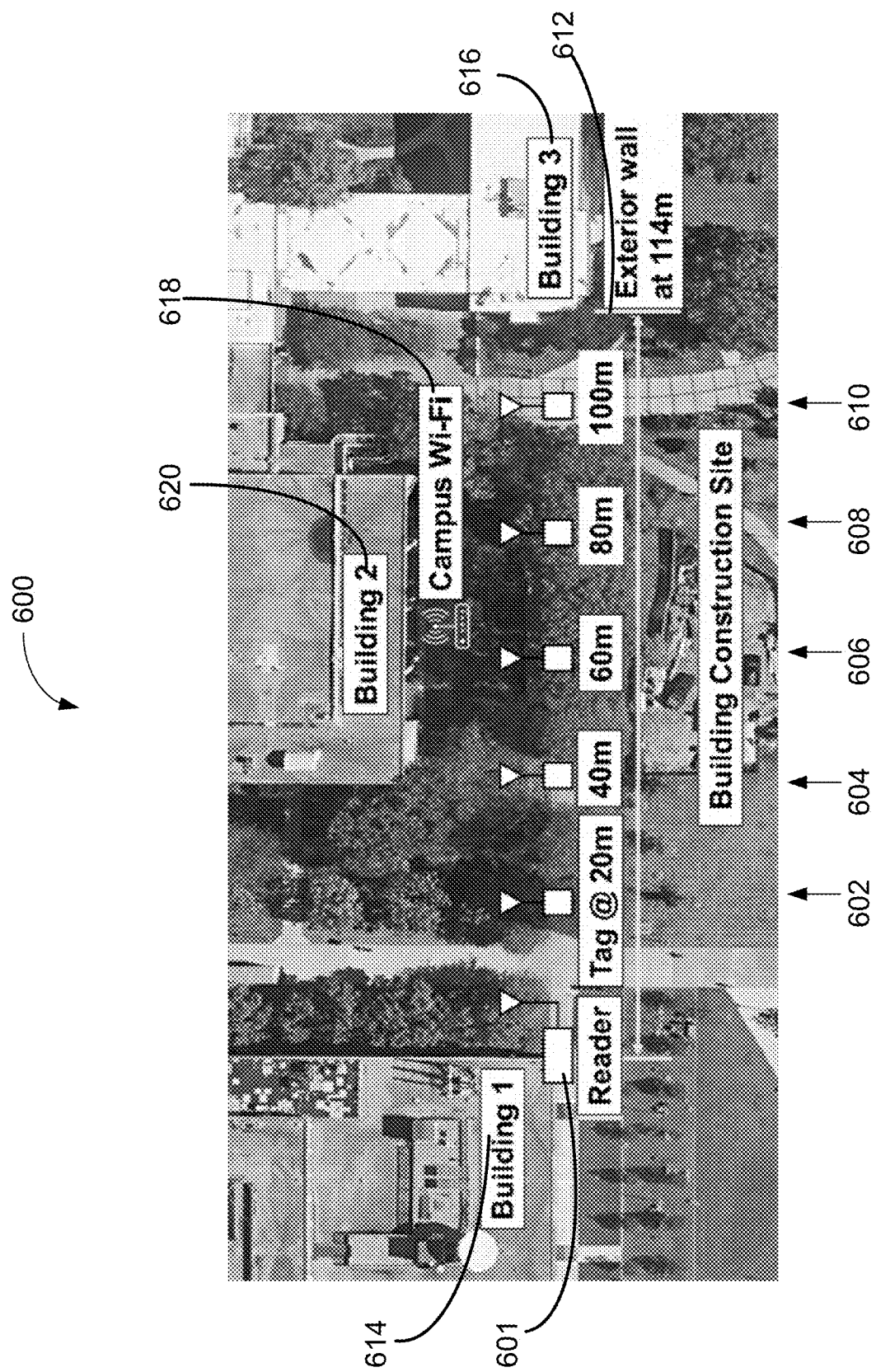
FIG. 6 illustrates a top view of an experimental arrangement for measuring distance, in accordance with certain exemplary implementations of the disclosed technology.

FIG. 6 illustrates a top view of an experimental setup 600 for measuring the distance from an RFID reader 601 to a corresponding tunneling tag sequentially placed and measured in 20-meter increments 602, 604, 606, 608, 610. The measurements were made to test the channel sounder and to investigate the impact of multipath and interference from multiple buildings in the vicinity. In this experimental setup 600, the RFID reader 601 was used to transmit unmodulated continuous wave signals in the 5.8 GHz ISM band, to receive the modulated signals backscattered by one tunneling tag at a time, and to down-convert the received signals into baseband I and Q components. An E-shaped patch antenna was used on the receiving front-end of the reader 601 while an omnidirectional monopole antenna was used for the tunneling tag. As shown in FIG. 6, the reader 301 was placed nearby Building 1 614 with the antennas facing Building 3 616 at about 114 m away.

The tunneling tag was moved 20 in meter increments 602, 604, 606, 608, 610 on a straight path between the two buildings 614 616 starting at a distance of 20 meters from the reader 601 and ending to 100 meters from the reader 601. An external wall 612 was located about 114 meters from the reader 601. Along the path, trees and bushes were always near the reader 601. A Wi-Fi router 618 located on the exterior wall of Building 2 620 was left powered on despite the possible interference it could have introduced to the system. To estimate the multipath delay spectrum and reader-to-tag distance, the reader 601 hopped from 5.725 GHz to 5.875 GHz with a step frequency of 200 kHz for each position 602, 604, 606, 608, 610 of the tag. To study the impact of dwell time on the ranging accuracy, the reader 601 was configured to dwell on each channel for 200 ms. In post-processing, different lengths of data were extracted to study the effects of various dwelling times. In particular, two different dwell times were investigated by using part of the digitized received signal of each channel, the slow hopping (10 ms) and the fast hopping (2 ms).

Figure 7A:
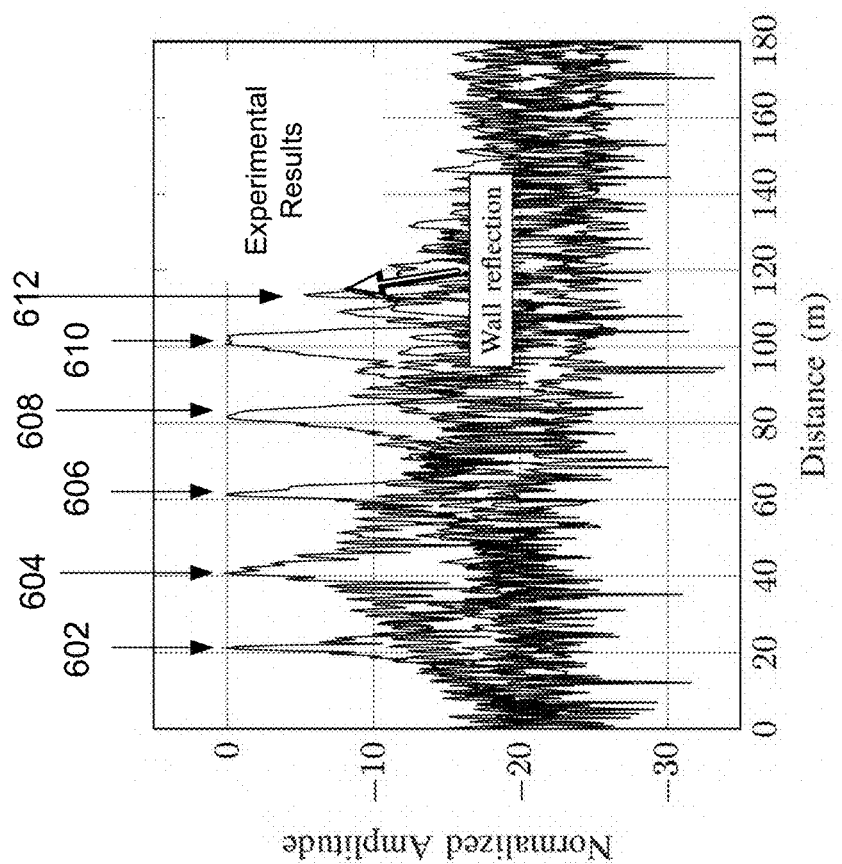
FIG. 7a is a graph of delay profile results calculated using the IDFT of normalized received signal experimental data.

FIG. 7a is a graph of delay profile results calculated using the IDFT of normalized received signal data using the experimental setup 600 shown in FIG. 6 and equation (9) above (IDFT norm) for a tunneling tag that was moved 20 in meter increments 602, 604, 606, 608, 610 on a straight path between the two buildings starting at a distance of 20 meters from the reader 601 and ending to 100 meters from the reader 601, as shown in FIG. 6. A reflection from the external wall 612 can be seen in this graph.

Figure 7B:
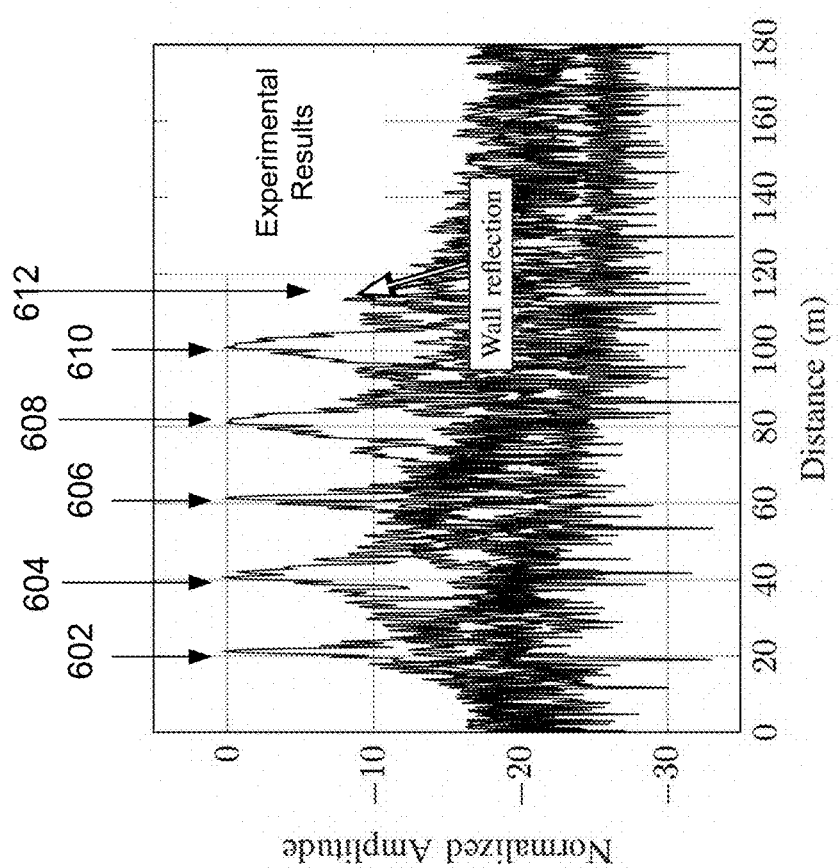
FIG. 7b is a graph of delay profile results calculated using the IDFT of un-normalized received signal experimental data. In accordance with certain exemplary implementations of the disclosed technology, the additional RSS information of un-normalized received signals can increase the detection accuracy of multipath components.

FIG. 7b is a graph of delay profile results calculated using the IDFT of un-normalized received signal experimental data using the experimental setup 600 shown in FIG. 6 and equation (10) above (IDFT un-norm). In accordance with certain exemplary implementations of the disclosed technology, the additional RSS information of un-normalized received signals can increase the detection accuracy of multipath components, as can be seen in the wall reflection 612 shown in FIG. 7b, as compared to the same wall reflection 612 shown in FIG. 7a.

The slow hopping configuration (dwell time of 10 ms) was used to calculate the average RSP for each frequency channel. Both normalized (FIG. 7a) and un-normalized delays (FIG. 7b) provide enough data to estimate the LoS component of the backscatter signals. However, with un-normalized delays (FIG. 7b), the reflections 612 from the wall (about 115 meters away from the reader) can be better distinguished from the noise floor at each set of measurements.

Figure 8:
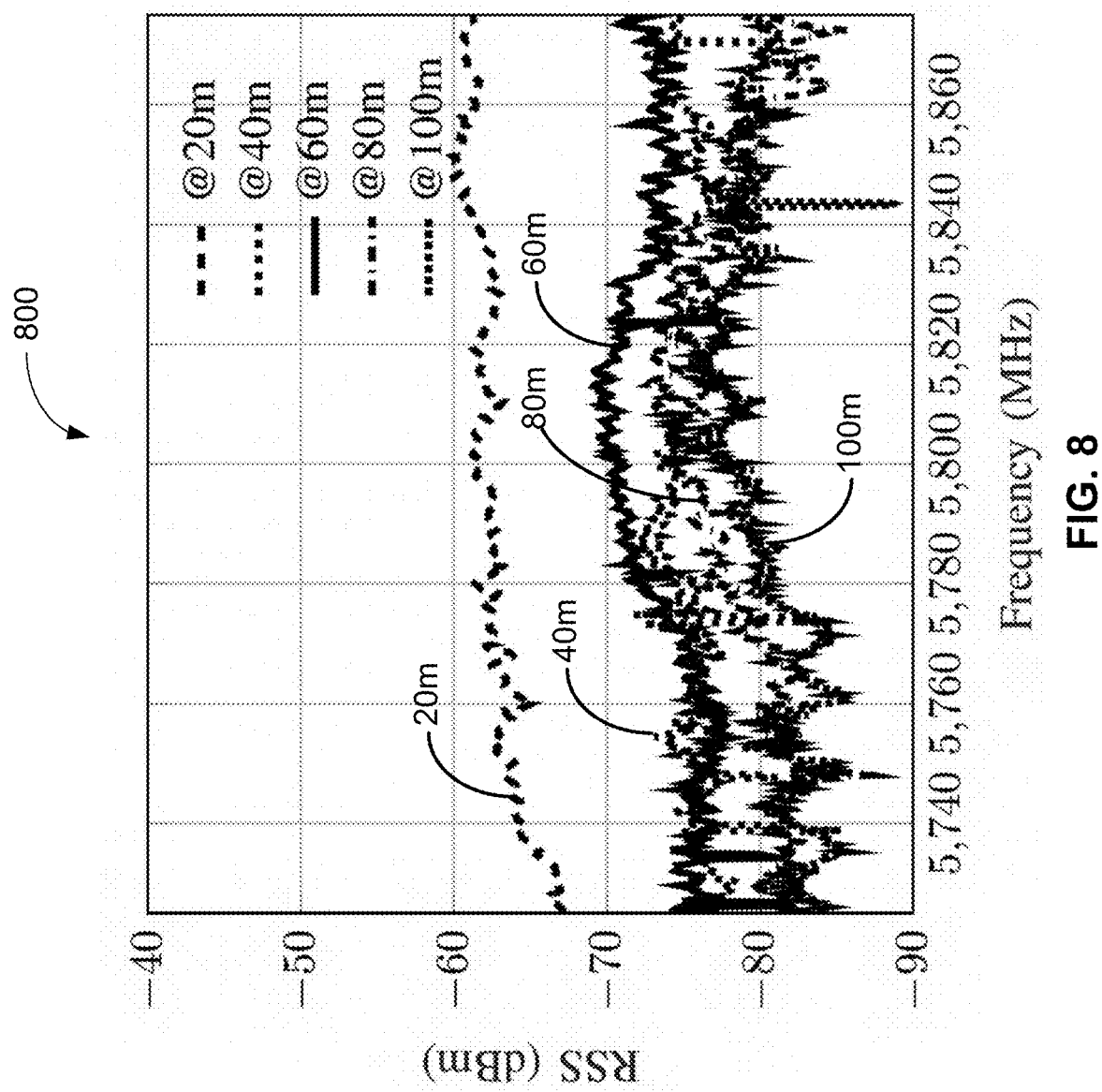
FIG. 8 shows measured RSS values of slow hopping mode in the frequency domain, where dips in the values were caused by pedestrians and vehicles momentarily obstructing the line-of-sight measurements.

FIG. 8 is a chart 800 showing measured RSS (received signal strength) values of the tunneling tag (measured using the setup 600 of FIG. 6) using the slow hopping mode in the frequency domain, where dips in the values were caused by pedestrians and vehicles momentarily obstructing the line-of-sight measurements. Due to the increase of reflective gain of the tunneling tag at lower impinging power levels, predictions on tag position become more difficult at longer distances, hence, the estimation error increases when based on RSS only. Note that the measurement results (depicted in FIGS. 7a, 7b, and 8) include interference caused by the campus WiFi 618 router (as shown in FIG. 6) resulting in a strong interference between 5.755 GHz and 5.575 GHz in most measurements, particularly when the tag is placed at 40 meters (604 FIG. 6). In this situation, the tunneling tag is saturated due to the high combined impinging power from the reader and the strong interference, resulting in a reduced gain. As shown in FIG. 8, the RSS with the tag at 40 meters is approximately at the same level as the tag at 60 meters and even at 80 meters at some frequencies, which causes an estimated delay profile at 40 meters and also shows a higher noise level compared to other distances.

Certain implementations of the channel sounding method disclosed herein can also be used to estimate the position of a tag by processing at the received LoS components of the backscattered signal, while the reader-to-tag distance may be estimated using equation (3) with only the differential RSP. The measured reader-to-tag distance includes the wave travel distance in cables and circuits, which is a constant and can be calibrated by using the first measurement at 20 m as a reference.

Figure 9A:
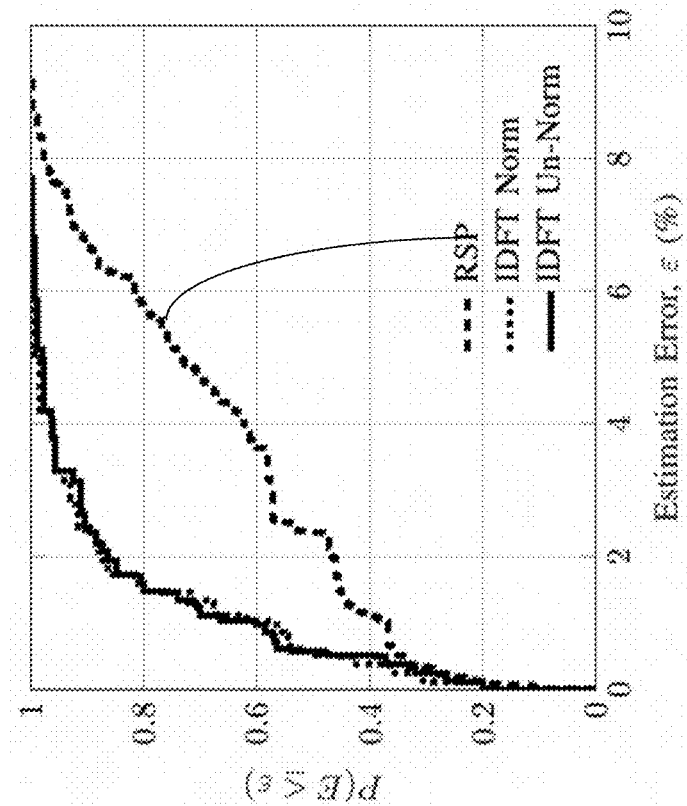
FIG. 9a shows error estimation using slow hopping (dwell time=10 ms).

FIG. 9a shows error estimation using a slow hopping reader (dwell time=10 ms) using RSP from equation (3) and two different methods IDFT norm from equation (9) and IDFT un-norm from equation (10). With the RSP based method, the mean, the RMS, and the 90th percentile errors of 0.86%, 1.28%, and 2.50%, respectively, are observed. The IDFT method reduces the 90th percentile error to 1.34% (by 46.4%), while the normalization does not significantly change the distance estimation accuracy. Both IDFT methods with or without normalization have a mean error of less than 0.47% and an RMS error of less than 0.65%.

The distance estimation accuracy also depends on many other factors, such as dwell time, number of frequency channels, the existence of interference, and thermal noise. Dwell time determines how fast the system can estimate the location of the tag. Although it may be beneficial to have faster prediction times, taking average RSP of more data when using a slower hopping reader can reduce the impact of the thermal noise and give a more accurate estimation of the RSP when the SNR is low.

Figure 9B:
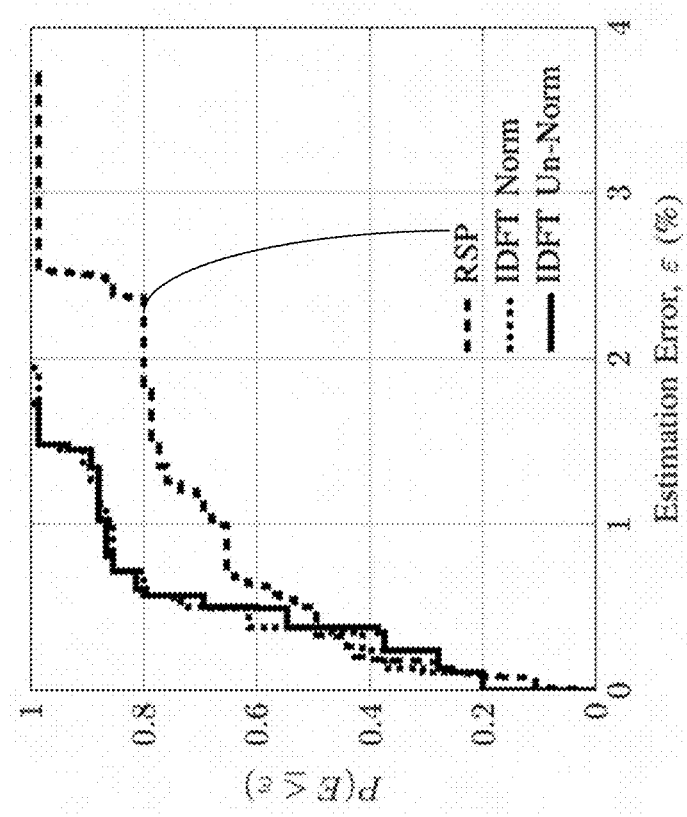
FIG. 9b shows error estimation using fast hopping (dwell time=2 ms).

FIG. 9b shows error estimation using fast hopping reader (dwell time=2 ms) using RSP from equation (3) and two different methods: IDFT norm from equation (9) and IDFT un-norm from equation (10). Compared to the RSP-based method, the IDFT methods perform significantly better in terms of both mean error (reduced from 2.87% to less than 1.01%) and 90th percentile error (reduced from 6.67% to less than 2.44%).

According to certain exemplary implementations, the data shows that the IDFT methods can lead to better distance estimation when using a fast hopping reader. In addition, the extra RSS information in the un-normalized IDFT method may not provide higher accuracy than the normalized IDFT method that only requires RSP.

In accordance with certain exemplary implementations of the disclosed technology, the signal-to-noise ratio (SNR) and signal-to-interference ratio (SIR) may also be factors for accurate distance estimation using the systems and methods disclosed herein. For example, in the experimental setup 600 discussed above with reference to FIG. 6, the campus Wi-Fi 618 operating in the same frequency band as the reader 601 can suppress the gain of the tunneling tag and may cause distance estimation offsets.

Figure 10B:
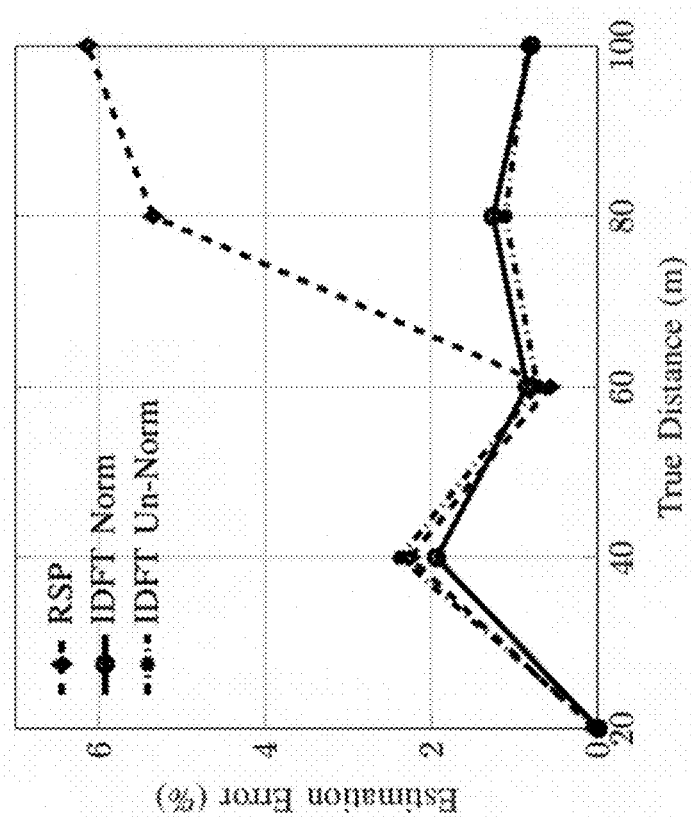
FIG. 10b shows mean error estimation using fast hopping (dwell time=2 ms).
Figure 10A:
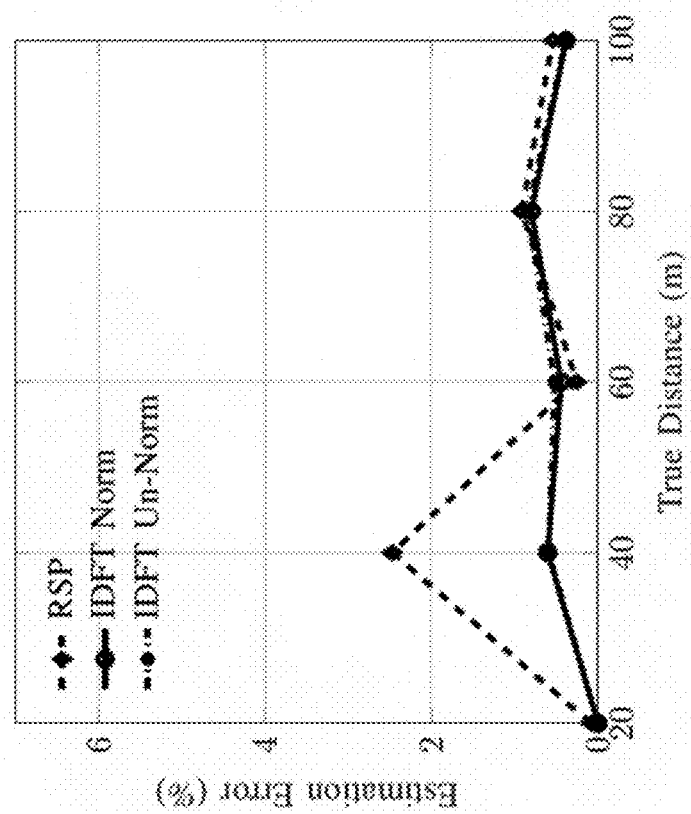
FIG. 10a shows mean error estimation using slow hopping (dwell time=10 ms).

FIG. 10*a* shows mean error estimation at each distance using slow hopping (dwell time=10 ms). When the tag is placed at 40 m, the tag receives the highest level of interference, causing a dramatic increase in the estimation error. This is also reflected in the higher 90th percentile error for the RSP-based method in FIG. 9*a*.

FIG. 10*b* shows mean error estimation at each distance using fast hopping (dwell time=2 ms). When using the fast hopping mode, the accuracy of both RSP- and IDFT-based methods may decrease at most distances. The RSP-based method may suffer from higher estimation error due to low SNR at longer distances (at 80 m and 100 m), while IDFT methods remain highly accurate (<1.26%) at such distances. In general, the data indicates that the IDFT methods may outperform the RSP-based method by a factor of 2 to 3.

Quantum Tunneling Tags

Figure 11:
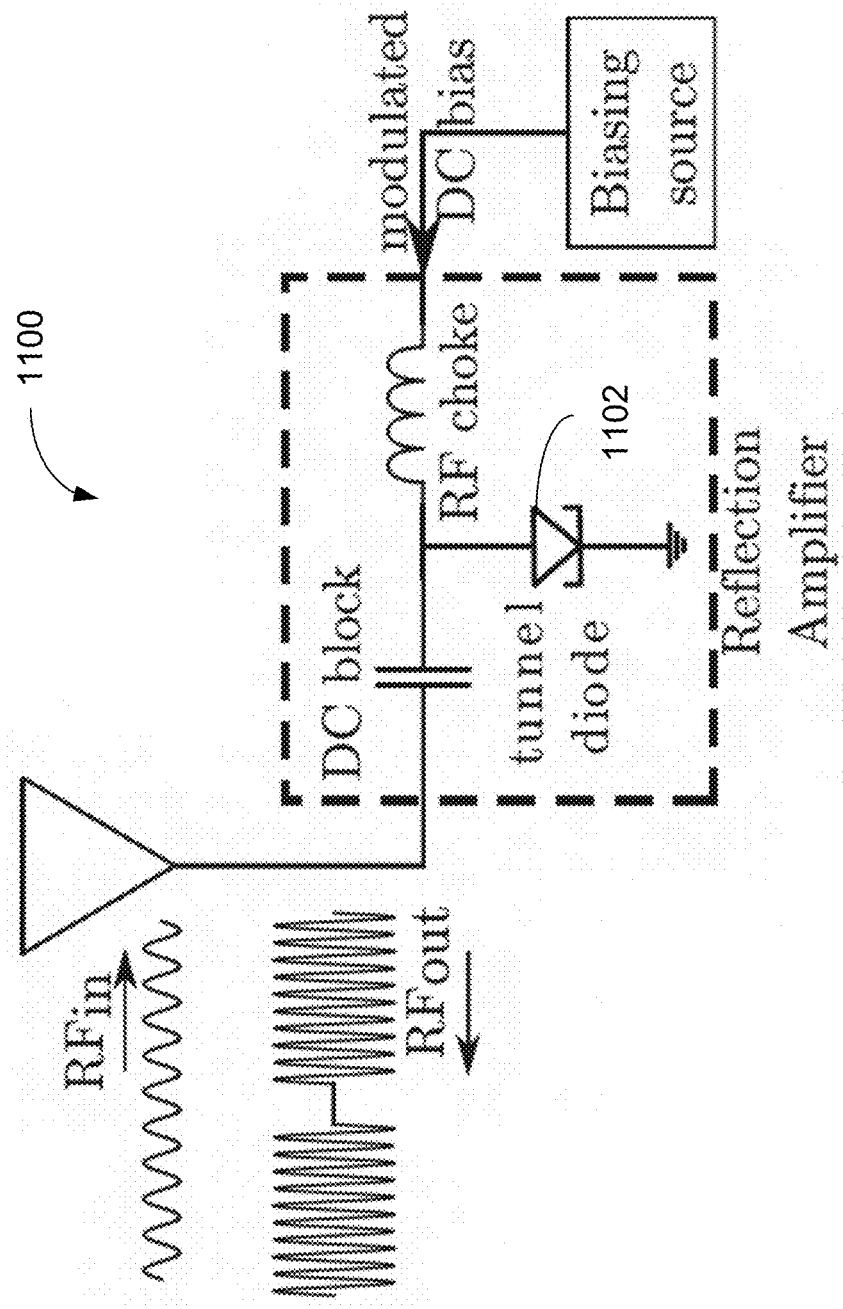
FIG. 11 illustrates a QTT, in accordance with certain exemplary implementations of the disclosed technology.

FIG. 11 illustrates a QTT 1100 that may be utilized with the disclosed technology. As discussed in "Tunneling RFID Tags for Long-Range and Low-Power Microwave Applications," Amato et al., IEEE Journal of Radio Frequency Identification. PP. 1-1. 10.1109/JRFID.2018.2852498, which is incorporated herein by reference, as if presented in full, traditional passive RFID systems have power constraints that can limit RFID tag communication to short ranges. However, certain exemplary implementations of the disclosed technology may overcome some of these limitations by employing QTTS.

The experimental results as discussed above with respect to FIGS. 6-10*b* were obtained using a QTT. QTTs are unique in that they have non-uniform gain depending on the impinging power level and its frequency response. Certain exemplary implementations of the disclosed technology may use a tunneling reflector that can act as a switching load for the tunneling tag. Certain exemplary implementations of the disclosed technology may take advantage of the natural negative differential resistance of a tunnel diode 1102 in the QTT 1100. While passive tags can have a maximum sensitivity of −22.1 dBm that corresponds to a maximum forward link range of 6.6 m at 5.8 GHz, tunneling tags, by being sensitive to RF input signals as low as −85 dBm, can reach a theoretical forward link of 9 km.

Exemplary Use Case 1

Localization With RSP-Based Ranging

Certain implementations of the disclosed technology may be utilized for a radiolocation system that can be extended to two and three-dimension positioning systems by using multiple and appropriate frequency hopping readers and tags. By measuring the distances of a tag from three (or four) readers at known locations, its 2D (or 3D) position can be extrapolated using a trilateration approach.

Trilateration is widely used in many well-known real-time positioning systems. Once the distance between a reader and a tag is computed through equation (3), the target device (such as a tag or reader) may be located on a circumference of a radius. To estimate the actual 2D location of the tag, the intersection of at least two circumferences is needed, however, the position is still not precise since the tag can be on either of the two intersection points or, in case of estimation errors, anywhere within the area of intersection. One way to eliminate the ambiguous point is by adding a third reader. Directional or Van Atta antennas may be utilized to further increase the position accuracy.

Figure 12A:
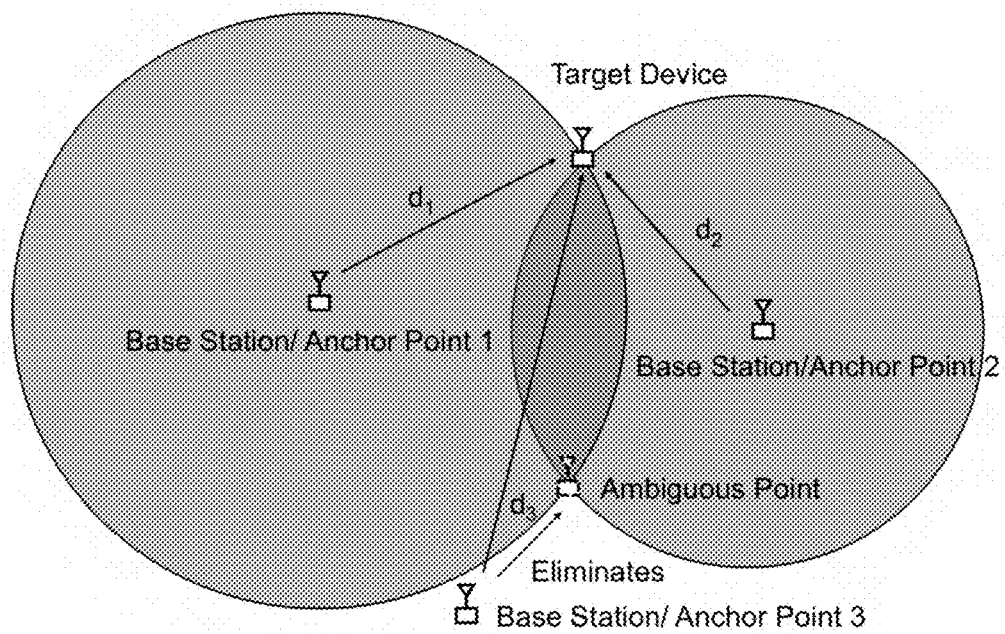
FIG. 12a illustrates a trilateration approach in which the location is estimated by intersecting two circles that identify the distance of an object from a target.

FIG. 12*a* illustrates a trilateration approach according to the disclosed technology, in which the location of a target device (tag) may be estimated by intersecting two circles surrounding readers that identify the distance from the corresponding reader to a target device, and where a third reader may be used to disambiguate the location of the target device. FIG. 12*a* depicts an example configuration, where a tag location is unknown (and possibly moving) and three or more readers (base stations) are fixed in location.

Figure 12B:
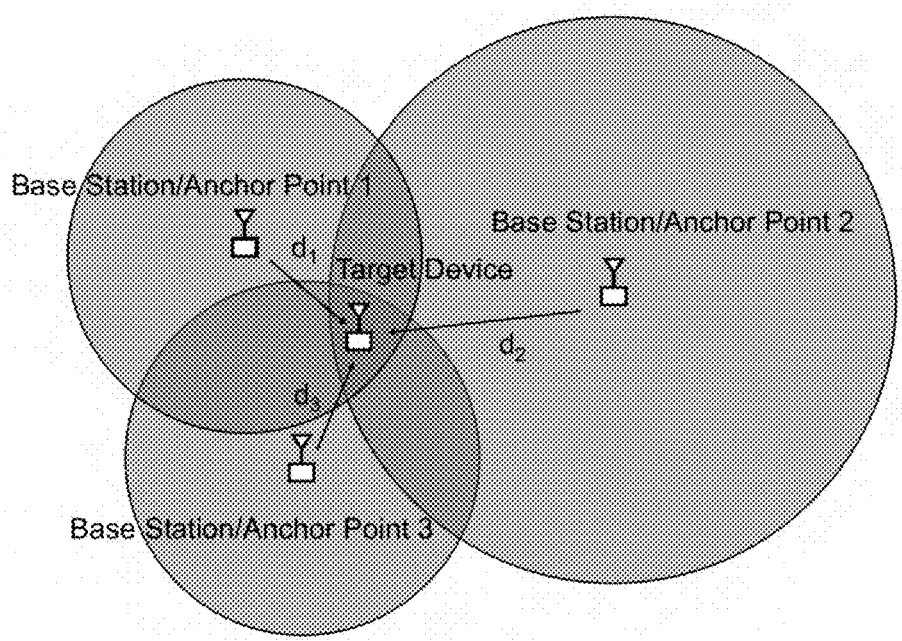
FIG. 12b illustrates another trilateration approach in which the location can be estimated.

FIG. 12*b* illustrates another trilateration approach in which a location of a reader (target device) is unknown or moving and three (or more) fixed tags (base stations) act as anchor points that enable the location of the reader to be estimated using trilateration methods described above. Tests were conducted using this configuration to estimate the reader-to-tag distances for each reader location with three fixed tags, and a tag-to-reader distance ranging from about 6 to about 9 meters. To achieve accurate positioning, calibration was performed to eliminate measurement offset caused by internal wave traveling within the RF cables, transmission lines, matching networks, etc. The same reader was used for all measurements, enabling the offset to be calibrated out by reference measurements. However, when different tags are used, each tag may perform differently, may need separate impedance matching and/or separate calibrations due to manufacturing imperfections. By placing the reader at a known location, the calculated distance d can be used to determine the value of the offset $d_o$ by $d_o = d - \hat{d}$, where d is true reader-to-tag distance. Nevertheless, estimation errors caused by time-varying factors (e.g.: tag movements due to the windy weather, changing multipath caused by people moving around the reader, etc.) also exist, which may not be calibrated out by reference measurements.

A first set of measurements at the first known reader location were used to calculate the offset $d_o$ for each tag based on 120 and 40 data points for 1D and 2D positioning, respectively. A mean error and an RMS error of 0.11 m and 0.14 m were observed for 1D estimations. While, in 2D, the calculated positions provide a mean and an RMS error of 0.17 m and 0.20 m, respectively. Considering the size of the reader's cart (about 1 m by 0.5 m) and the placement error, the achieved positioning error is smaller than the size of the target. Moreover, the estimated position of the reader is both accurate and precise. Note that the distance estimation error remains the same while the reader-to-tag distance increases. Thus, the percentage error is expected to be lower at longer ranges. Similar accuracy improvements are expected for using this system in a larger area covered by more tags or readers. Although only the reverse positioning system has been shown in this set of experiments, the same performance is expected for the configuration in which multiple fixed readers are used for localizing one or more moving tags.

Exemplary Use Case 2

Motion Tracking and Capture

Motion tracking and capture have recently been used as a basis for computer animation in many applications, including but not limited to television, video games, sports, and education. In the traditional systems, a performer wears visibly reflective markers near each joint, the scene is typically captured by one or more video cameras, and the output from the cameras may be used to compute by the positions or angles between the markers so that the relative position of the marker in space may be computed.

Figure 13:
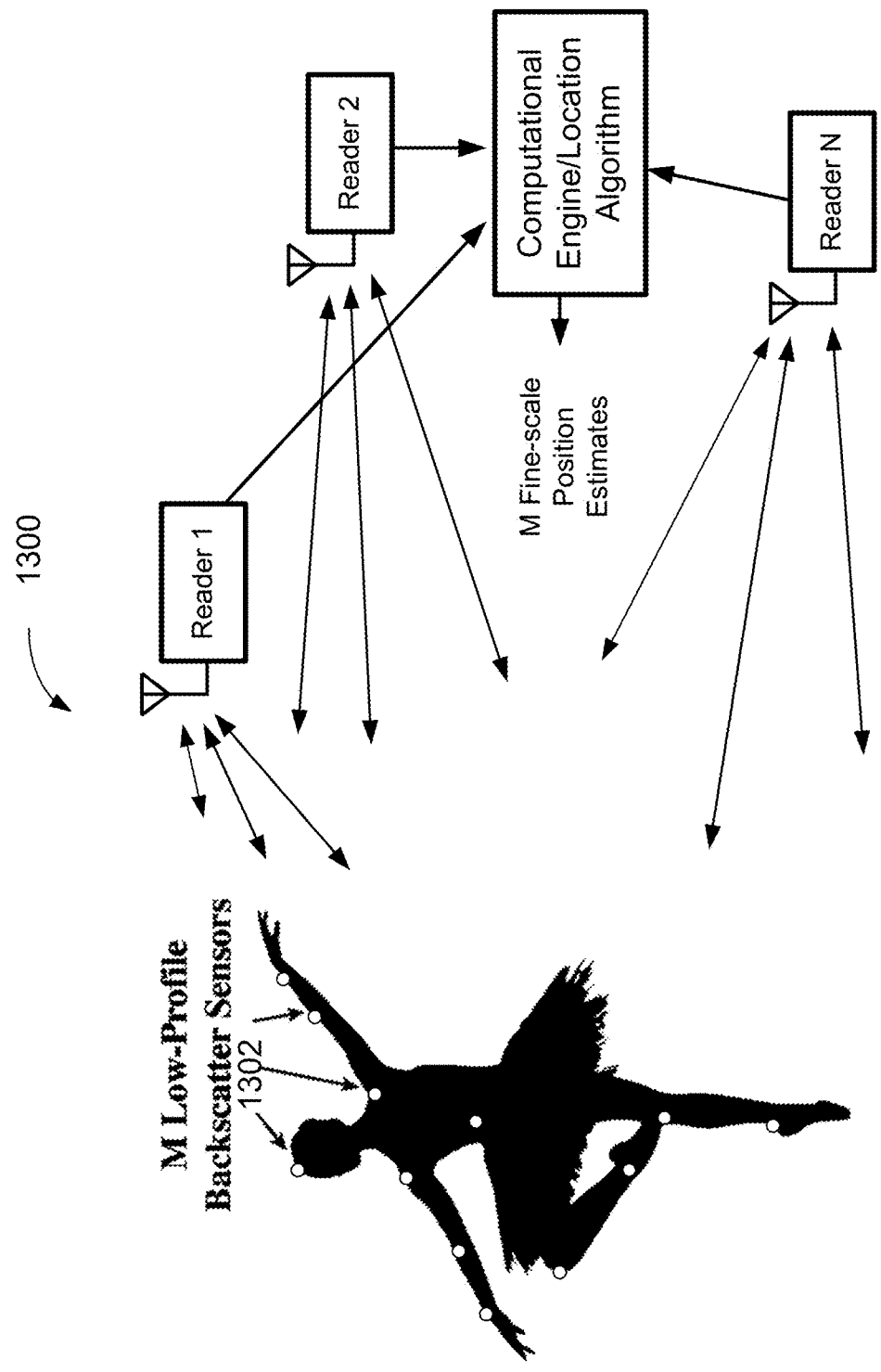
FIG. 13 illustrates a motion-tagging use case in which a plurality of tags and readers may be employed, in accordance with certain implementations of the disclosed technology.

FIG. 13 illustrates a motion-capture use case in which the disclosed technology may be utilized to determine positions of a plurality of tags 1302 in real-time. As shown, M low-profile backscatter tags 1305 may be attached to the target (a ballerina in this case) and N readers may be employed to extract/disambiguate the location of each of the tags (for example, as discussed above with reference to FIGS. 12a and/or 12b). The disclosed technology may provide both higher spatial and temporal resolution compared with traditional systems.

In certain exemplary implementations, each backscatter tag 1302 may have a unique ID which may help eliminate marker swapping and may provide much cleaner data than other technologies. In certain exemplary implementations, the use of the SFCW RF interrogation signal and the backscatter RFID tags may enable motion capture outdoors in direct sunlight and may provide better results for lower operational costs.

Figure 14:
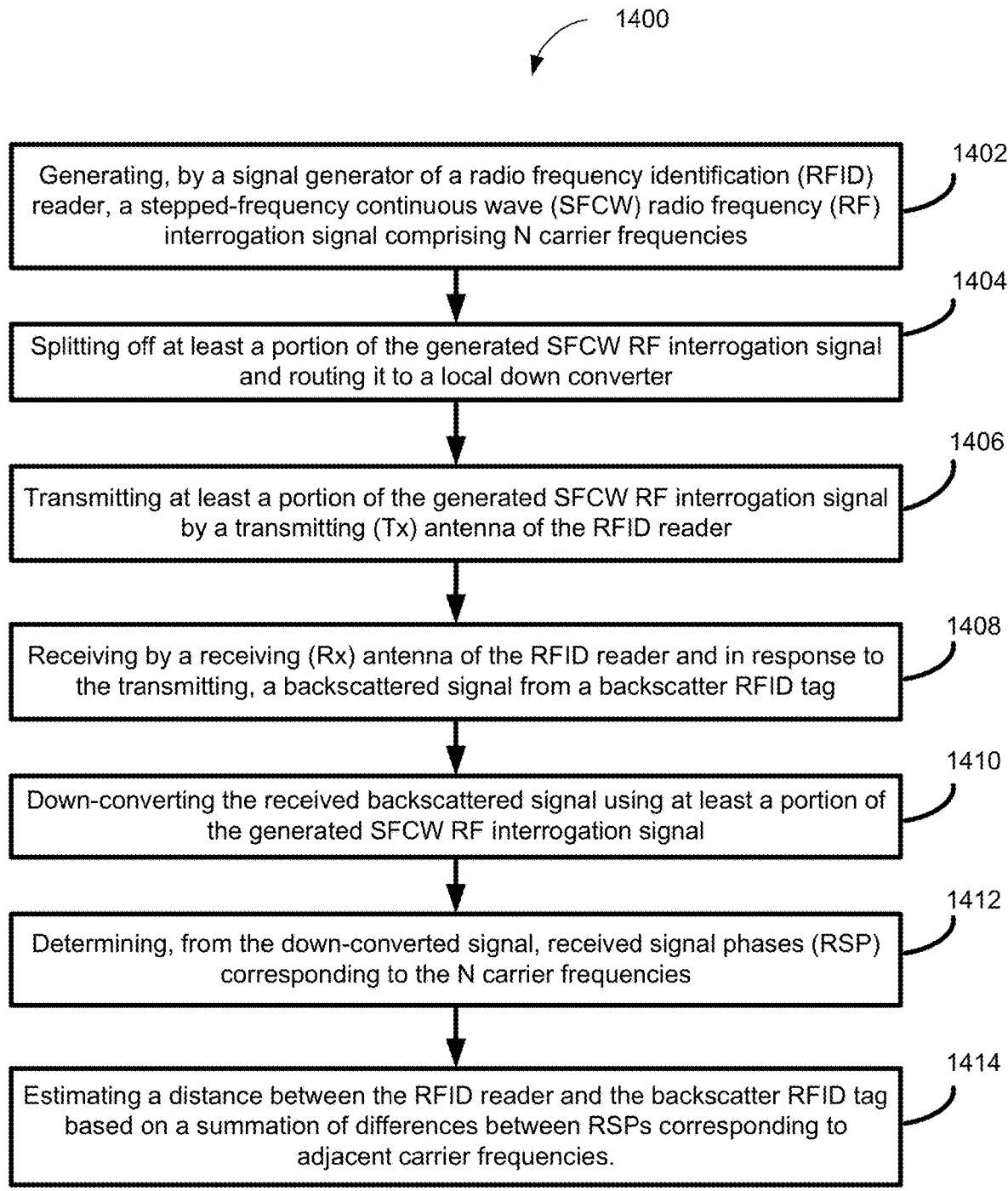
FIG. 14 is a flow diagram of a method, according to an exemplary implementation of the disclosed technology.

FIG. 14 is a flow diagram of a method 1400 of radiolocation, according to an exemplary implementation of the disclosed technology. In block 1402, the method 1400 includes generating, by a signal generator of a RFID reader, a SFCW RF interrogation signal comprising N carrier frequencies. In block 1404, the method 1400 includes splitting off at least a portion of the generated SFCW RF interrogation signal and routing it to a local down converter. In block 1406, the method 1400 includes transmitting at least a portion of the generated SFCW RF interrogation signal by a Tx antenna of the RFID reader. In block 1408, the method 1400 includes receiving by a Rx antenna of the RFID reader and in response to the transmitting, a backscattered signal from a backscatter RFID tag. In block 1410, the method 1400 includes down-converting the received backscattered signal using at least a portion of the generated SFCW RF interrogation signal. In block 1412, the method 1400 includes determining, from the down-converted signal, RSP corresponding to the N carrier frequencies. In block 1414, the method 1400 includes estimating a distance between the RFID reader and the backscatter RFID tag based on a summation of differences between RSPs corresponding to adjacent carrier frequencies.

In certain exemplary implementations, the backscatter RFID tags include one or more QTTs.

Certain exemplary implementations of the disclosed technology can include one or more of determining a RSS, determining a received signal phase (RSP) from the down-converted signal, determining a normalized complex received signal from the down-converted signal, determining an un-normalized complex received signal from the down-converted signal, determining a delay profile using both the normalized complex received signal and un-normalized complex received signal, and/or estimating an improved distance measurement RFID reader and the backscatter RFID tag based on the delay profile.

In certain exemplary implementations, the backscattered signal received from the one or more backscatter RFID tags can include a version of the SFCW RF interrogation signal that is modulated and backscattered by the one or more backscatter RFID tags.

In accordance with certain exemplary implementations of the disclosed technology, the down-converting may be performed by a local down-converter of the RFID reader. In certain exemplary implementations, the local down-converter may be configured to output an I output and Q output corresponding to the backscattered signal.

In certain exemplary implementations, the SFCW RF interrogation signal may be characterized by a sequence of stepped frequencies in a 5.8 GHz ISM band. In certain exemplary implementations, the stepped frequencies may be characterized by a dwell time.

Certain exemplary implementations of the disclosed technology may utilize two or more RFID readers to triangulate the location of the backscatter RFID tag. Certain exemplary implementations of the disclosed technology may utilize three RFID readers to triangulate and disambiguate a location of the backscatter RFID tag.

Certain exemplary implementations of the disclosed technology may utilize two or more RFID readers for trilateration, to trilaterate the location of the backscatter RFID tag. Certain exemplary implementations of the disclosed technology may utilize three RFID readers to trilaterate and disambiguate a location of the backscatter RFID tag.

Certain exemplary implementations of the disclosed technology may include receiving by the (Rx) antenna of the RFID reader and in response to the transmitting, backscattered signals from a plurality of backscatter RFID tags and estimating a distance between the RFID reader and the plurality of backscatter RFID tags.

Certain exemplary implementations of the disclosed technology can include sensing one or more structures between the RFID reader and the backscatter RFID tag based on delayed or multipath components of the backscattered signal.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. A method comprising:
generating, by a signal generator of a radio frequency identification (RFID) reader, a stepped-frequency continuous wave (SFCW) radio frequency (RF) interrogation signal comprising N carrier frequencies;
splitting off at least a portion of the generated SFCW RF interrogation signal and routing the generated SFCW RF interrogation signal to a local down converter;
transmitting at least a portion of the generated SFCW RF interrogation signal by a transmitting (Tx) antenna of the RFID reader;
receiving, by a receiving (Rx) antenna of the RFID reader and in response to the transmitting, a backscattered signal from one or more backscatter RFID tags;
down-converting the received backscattered signal using at least a portion of the generated SFCW RF interrogation signal;

determining, from the down-converted signal, received signal phases (RSPs) corresponding to the N carrier frequencies; and estimating a distance between the RFID reader and one or more of the backscatter RFID tags based on a summation of differences between RSPs corresponding to adjacent carrier frequencies;

wherein:

determining the RSPs corresponds to the N carrier frequencies and a received signal strength (RSS) from the down-converted signal; and the method further comprises determining a delay profile using both a normalized complex received signal from the down-converted signal and an un-normalized complex received signal from the down-converted signal.

2. The method of claim 1 further comprising:
estimating an improved distance measurement between the RFID reader and one or more of the backscatter RFID tags based on the delay profile; and
outputting the improved estimate of the distance measurement.

3. The method of claim 2 further comprising:
determining the normalized complex received signal from the down-converted signal; and
determining the un-normalized complex received signal from the down-converted signal.

4. The method of claim 1, wherein the backscattered signal received from one or more of the backscatter RFID tags comprises a version of the SFCW RF interrogation signal that is modulated and backscattered by one or more of the backscatter RFID tags.

5. The method of claim 1, wherein the down-converting is performed by a local down-converter of the RFID reader; and
wherein the local down-converter is configured to output an in-phase (I) output and quadrature (Q) output corresponding to the backscattered signal.

6. The method of claim 1, wherein the SFCW RF interrogation signal is characterized by a sequence of stepped frequencies in a 5.8 GHz industrial, scientific, and medical (ISM) band; and
wherein each of the stepped frequencies are characterized by a dwell time.

7. The method of claim 1 further comprising utilizing three or more RFID readers to triangulate a location of one or more of the backscatter RFID tags.

8. The method of claim 1, wherein the receiving comprises receiving, by the (Rx) antenna of the RFID reader, and in response to the transmitting, backscattered signals from a plurality of backscatter RFID tags and estimating a distance between the RFID reader and the plurality of backscatter RFID tags.

9. The method of claim 1 further comprising sensing one or more structures between the RFID reader and one or more of the backscatter RFID tags based on delayed or multipath components of the backscattered signal.

10. The method of claim 1 further comprising:
determining the normalized complex received signal from the down-converted signal;
determining the un-normalized complex received signal from the down-converted signal;
estimating an improved distance measurement between the RFID reader and one or more of the backscatter RFID tags based on the delay profile; and
outputting the improved estimate of the distance measurement.

11. The method of claim 10, wherein the backscattered signal received from one or more of the backscatter RFID tags comprises a version of the SFCW RF interrogation signal that is modulated and backscattered by one or more of the backscatter RFID tags;
wherein the down-converting is performed by a local down-converter of the RFID reader; and
wherein the local down-converter is configured to output an in-phase (I) output and quadrature (Q) output corresponding to the backscattered signal.

12. The method of claim 11, wherein the SFCW RF interrogation signal is characterized by a sequence of stepped frequencies in a 5.8 GHz industrial, scientific, and medical (ISM) band; and
wherein each of the stepped frequencies are characterized by a dwell time.

13. A radio frequency identification (RFID) radiolocation system comprising:
a signal generator configured to output a stepped-frequency continuous wave (SFCW) radio frequency (RF) interrogation signal comprising N carrier frequencies;
a transmitting (Tx) antenna;
a receiving (Rx) antenna configured to receive a backscattered signal from one or more backscatter RFID tags;
a down-converter configured to output a down-converted signal comprising an in-phase (I) output and a quadrature-phase (Q) output;
a splitter in communication with the signal generator, the Tx antenna, and the down-converter, wherein the splitter is configured to send:
a first portion of the SFCW RF interrogation signal to the Tx antenna; and
a second portion of the SFCW RF interrogation signal to the down-converter;
a software-defined radio configured to digitize and filter the down-converted signal from the down-converter; and
one or more processors in communication with the software-defined radio, one or more of the processors configured to:
determine, from the down-converted signal, received signal phases (RSPs) corresponding to the N carrier frequencies;
estimate a distance between the RFID radiolocation system and one or more of the backscatter RFID tags based on a summation of differences between RSPs corresponding to adjacent carrier frequencies; and
output the estimate of the distance;
wherein:
one or more of the backscatter RFID tags comprise a quantum tunneling tag (QTT);
determining the RSPs corresponds to the N carrier frequencies and a received signal strength (RSS) from the down-converted signal; and
one or more of the processors are further configured to:
determine a normalized complex received signal from the down-converted signal;
determine an un-normalized complex received signal from the down-converted signal;
determine a delay profile using both the normalized complex received signal and the un-normalized complex received signal;
estimate an improved distance measurement between the RFID radiolocation system and one or more of the backscatter RFID tags based on the delay profile; and output the improved estimate of the distance measurement.

14. The system of claim 13, wherein one or more of the processors are further configured to determine the RSS from the down-converted signal.

15. The system of claim 13, wherein the backscattered signal received from one or more of the backscatter RFID tags comprises a version of the SFCW RF interrogation signal that is modulated and backscattered by one or more of the backscatter RFID tags.

16. The system of claim 13, wherein the SFCW RF interrogation signal is characterized by a sequence of stepped frequencies in a 5.8 GHz ISM band; and
wherein each of the stepped frequencies are characterized by a dwell time.

17. The system of claim 13 further comprising one or more amplifiers.

18. A system comprising:
three or more radiolocation systems, each comprising the RFID radiolocation system of claim 13;
wherein the three or more radiolocation systems are configured to triangulate a location of one or more of the backscatter RFID tags.

19. A non-transitory computer-readable medium having stored thereon computer-readable instructions that, when executed by one or more processors, cause one or more of the processors to execute a method comprising:
generating, by a signal generator of a radio frequency identification (RFID) reader, a stepped-frequency continuous wave (SFCW) radio frequency (RF) interrogation signal comprising N carrier frequencies;
splitting off at least a portion of the generated SFCW RF interrogation signal and routing the generated SFCW RF interrogation signal to a local down converter;
transmitting at least a portion of the generated SFCW RF interrogation signal by a transmitting (Tx) antenna of the RFID reader;
receiving, by a receiving (Rx) antenna of the RFID reader and in response to the transmitting, a backscattered signal from one or more backscatter RFID tags;
down-converting the received backscattered signal using at least a portion of the generated SFCW RF interrogation signal;
determining, from the down-converted signal, received signal phases (RSPs) corresponding to the N carrier frequencies; and
estimating a distance between the RFID reader and one or more of the backscatter RFID tags based on a summation of differences between RSPs corresponding to adjacent carrier frequencies;
wherein:
one or more of the backscatter RFID tags comprise a quantum tunneling tag (QTT);
determining the RSPs corresponds to the N carrier frequencies and a received signal strength (RSS) from the down-converted signal; and
the method further comprises determining a delay profile using both a normalized complex received signal from the down-converted signal and an un-normalized complex received signal from the down-converted signal.

20. The non-transitory computer-readable medium of claim 19, wherein one or more of the processors are in communication with:
the signal generator;
a software-defined radio configured to digitize and filter the down-converted signal; and
memory.

* * * * *